United States Patent
Tambo et al.

[11] Patent Number: 5,759,726
[45] Date of Patent: Jun. 2, 1998

[54] ELECTROGRAPHIC PHOTOSENSITIVE MEMBER

[75] Inventors: Fumiaki Tambo; Katsumi Daimon; Masakazu Iijima; Kazuo Yamasaki; Ryosaku Igarashi; Yasuhiro Yamaguchi, all of Minami-ashigara, Japan

[73] Assignee: Fuji Xerox Co., Ltd., Tokyo, Japan

[21] Appl. No.: 783,327

[22] Filed: Jan. 15, 1997

[30] Foreign Application Priority Data

Jan. 17, 1996 [JP] Japan .................. 8-005963
Jun. 19, 1996 [JP] Japan .................. 8-158183

[51] Int. Cl.$^6$ .................................................. G03G 5/06
[52] U.S. Cl. ........................................ 430/58; 430/78
[58] Field of Search ............................ 430/58, 59, 78, 430/76

[56] References Cited

U.S. PATENT DOCUMENTS

| | | | |
|---|---|---|---|
| 5,588,991 | 12/1996 | Hongo et al. | 117/2 |
| 5,626,999 | 5/1997 | Iragaki et al. | 430/78 |

FOREIGN PATENT DOCUMENTS

| | | |
|---|---|---|
| A-47-6341 | 4/1972 | Japan . |
| A-48-26141 | 4/1973 | Japan . |
| A-48-34189 | 5/1973 | Japan . |
| A-48-47344 | 7/1973 | Japan . |
| A-49-105536 | 10/1974 | Japan . |
| A-57-148745 | 9/1982 | Japan . |
| A-58-21416 | 2/1983 | Japan . |
| A-58-105155 | 6/1983 | Japan . |
| A-59-160147 | 9/1984 | Japan . |
| B-61-35551 | 2/1986 | Japan . |
| A-61-110153 | 5/1986 | Japan . |
| A-61-151659 | 7/1986 | Japan . |
| A-63-208853 | 8/1988 | Japan . |
| A-64-3671 | 1/1989 | Japan . |
| A-1-217362 | 8/1989 | Japan . |
| A-5-98181 | 4/1993 | Japan . |
| A-5-194523 | 8/1993 | Japan . |

*Primary Examiner*—John Goodrow
*Attorney, Agent, or Firm*—Oliff & Berridge, PLC

[57] ABSTRACT

An excellent electrographic photosensitive member having a high sensitivity, a high chargeability and a low residual potential. The electrographic photosensitive member comprises a photosensitive layer, or a photosensitive layer and an underlayer superimposed over an electroconductive support, wherein the photosensitive layer and/or the underlayer contain a chlorogallium phthalocyanine which is substituted with an electron-withdrawing group and has the following formula:

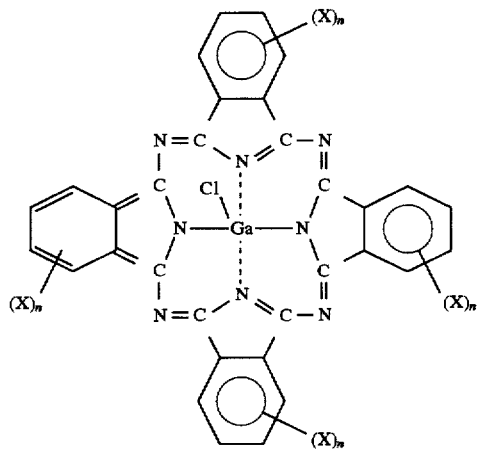

where X represents an electron-withdrawing group such as a halogen atom and n is an integer of 2 to 4.

21 Claims, 20 Drawing Sheets

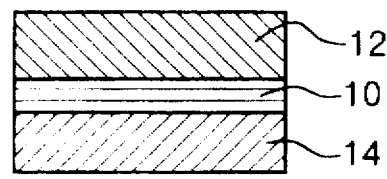
F I G. 1
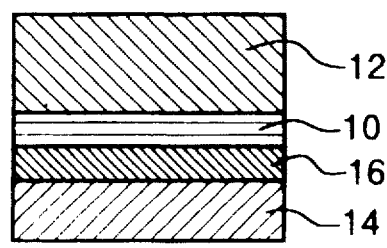
F I G. 2
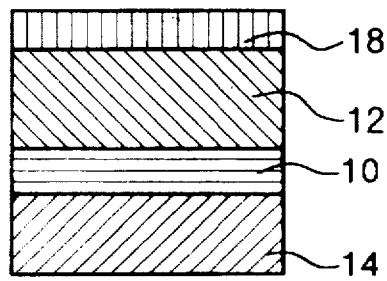
F I G. 3
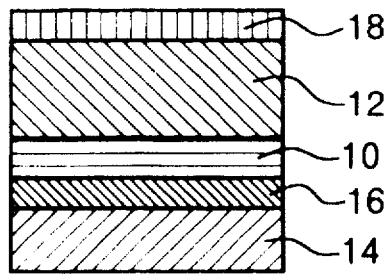
F I G. 4

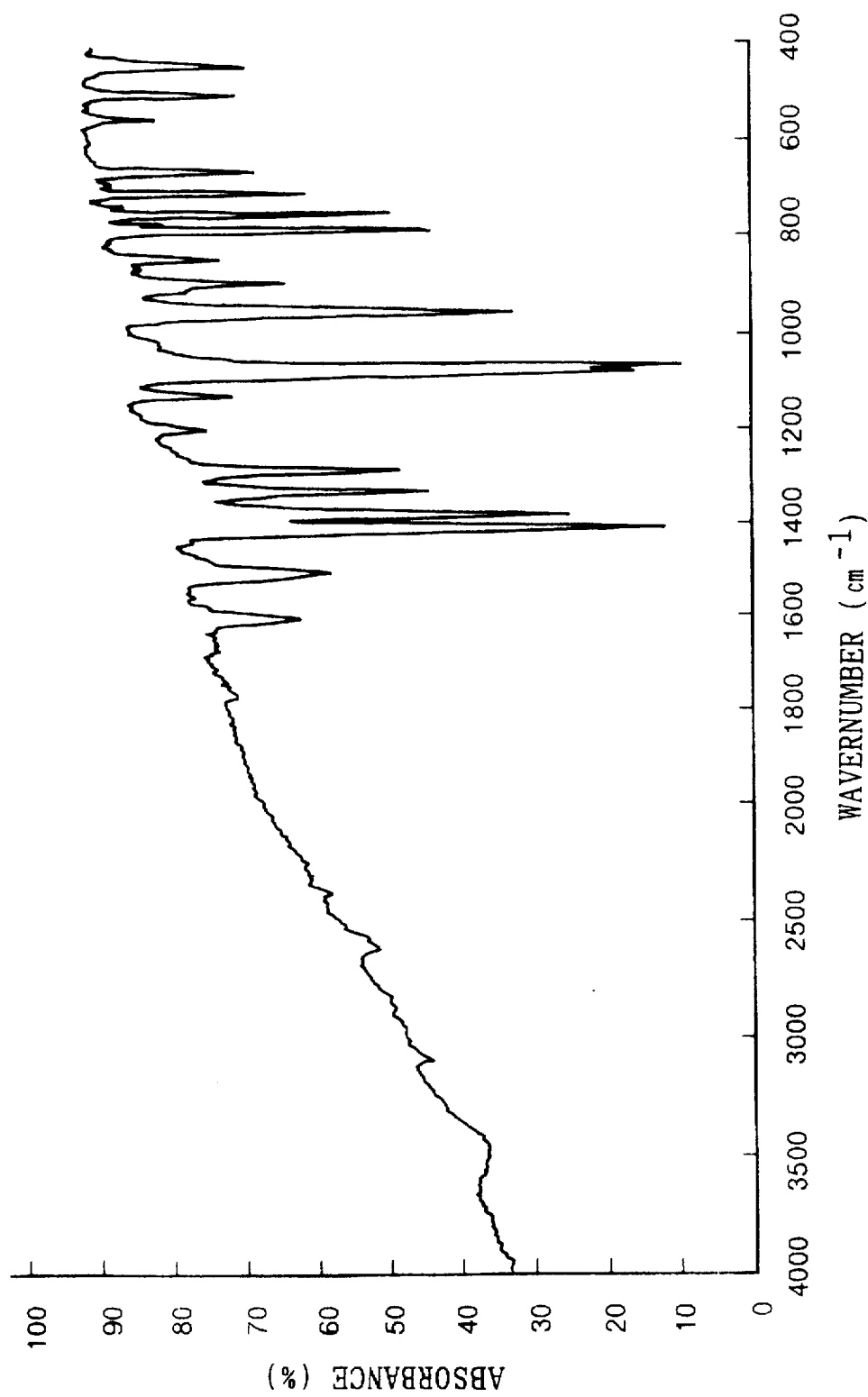

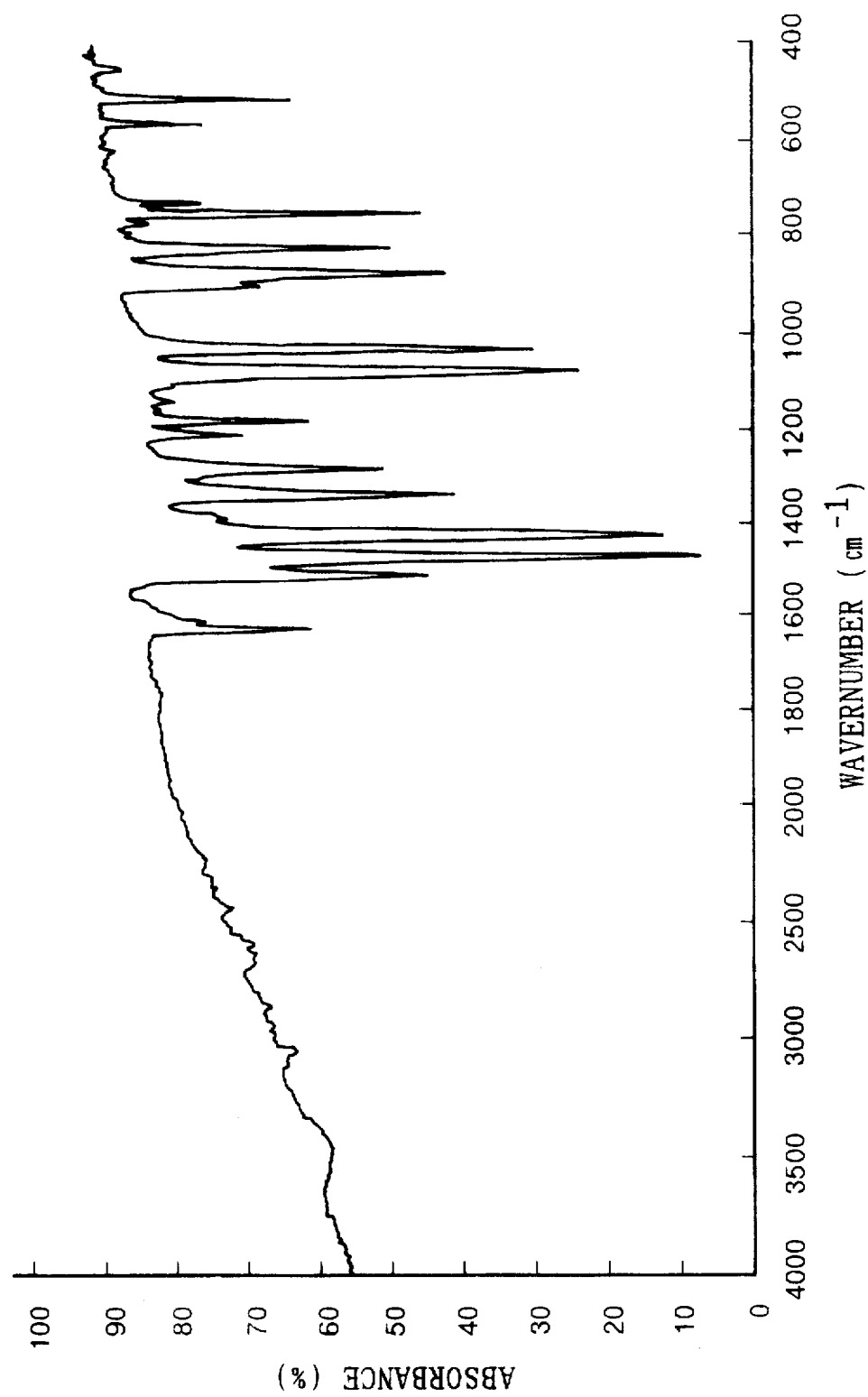
F I G. 2 5

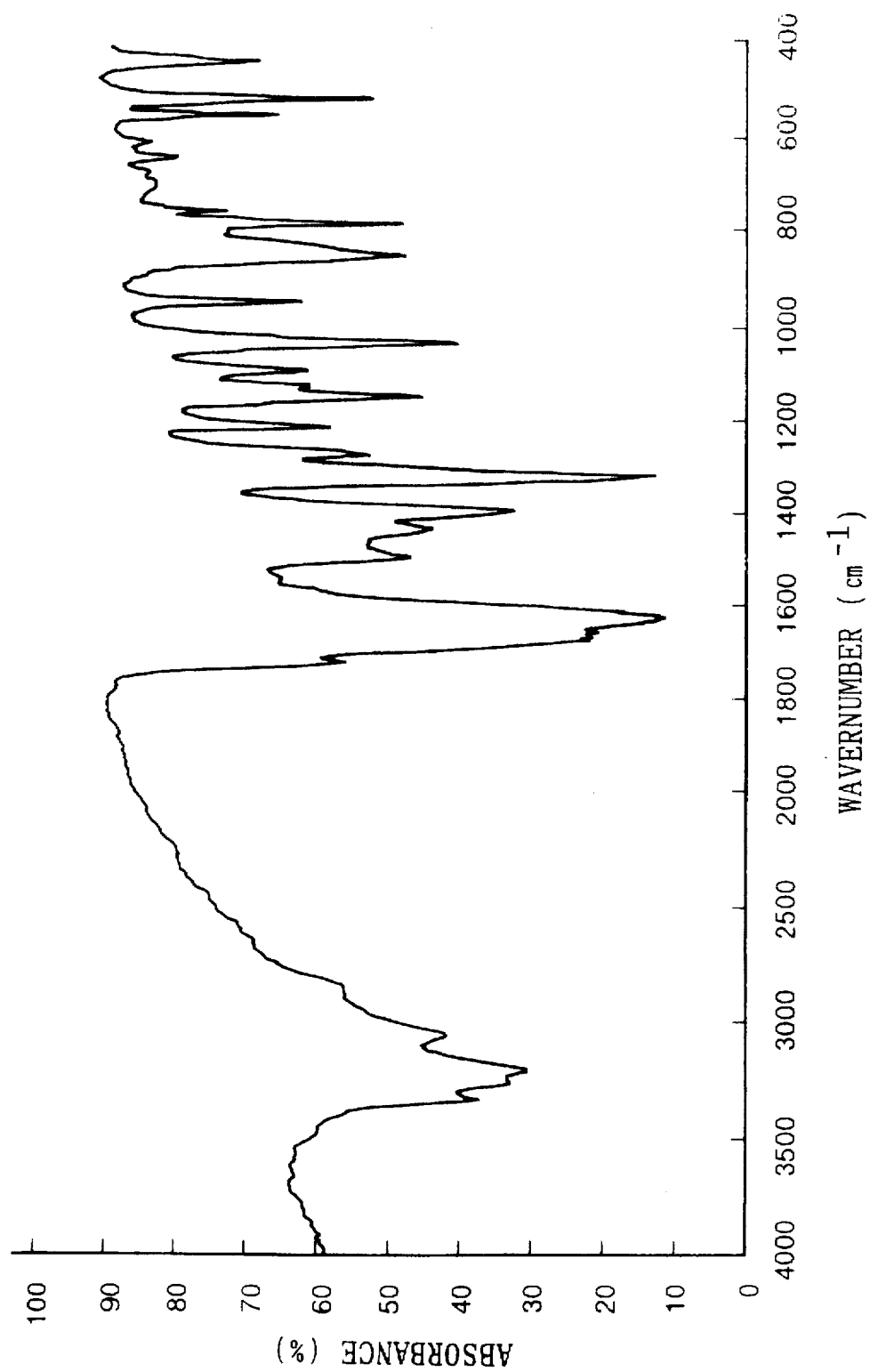

ELECTROGRAPHIC PHOTOSENSITIVE MEMBER

BACKGROUND OF THE INVENTION

1. Field of the Invention

The present invention relates to an electrographic photosensitive member. More particularly, the present invention relates to an electrographic photosensitive member which is obtained by using a chlorogallium phthalocyanine substituted with an electron-withdrawing group in a photosensitive layer or in an underlayer on an electroconductive substrate and is characterized by being of a negatively charged type and by having a high sensitivity, a high chargeability and a low residual potential.

2. Description of Related Art

Heretofore, many types have been proposed as a photosensitive material in an electrographic photosensitive member. Further, a variety of organic compounds have been proposed as an electric charge generating material for a laminate photosensitive member whose photosensitive layer is divided into an electric charge generating layer and an electric charge transporting layer and also for a single-layer photosensitive member in which a single layer has an electric charge generating function and an electric charge transporting function. One of the recent conspicuous demands is to expand the photosensitive wavelength region of an organic photoconductive material hitherto proposed to a semiconductor laser wavelength of a near-infrared region (780–830 nm) so that the organic photoconductive material becomes usable as a photosensitive member for digital recording in a laser printer or the like. Proposed as photoconductive materials for a semiconductor laser from the above-mentioned viewpoint are photoconductive materials which include a squarelirium compound (JP-A Nos. 49-105536 and 58-21416), a tris-azo compound based on a triphenyl amine (JP-A No. 61-151659) and a phthalocyanine compound (JP-A Nos. 48-34189 and 57-148745).

When using an organic photoconductive material as a photosensitive material for a semiconductor laser, the requirements are that the photosensitive wavelength of the organic photoconductive material is long enough to enter the region of a long wavelength and that the photosensitive member provides excellent electrical properties and durability.

Among the organic photoconductive materials, attention is drawn to a phthalocyanine compound as a substance which exhibits sensitivity in the wavelength region of a semiconductor laser. However, a phthalocyanine compound has not been found yet which exhibits excellent properties of electrophotography in the region ranging from a visible light to a semiconductor laser oscillation and which belongs to a negatively charged type. In addition, a drawback associated with a known phthalocyanine compound is that residual potential significantly rises in the case where the phthalocyanine compound is used as an electrographic photosensitive member, in particular a single-layer photosensitive member.

In order to improve particularly the above-mentioned laminate electrographic photosensitive member, various attempts have been made which include an attempt to impart a high chargeability, a high sensitivity and a low residual potential, an attempt to maintain the foregoing properties during repeated use of the photosensitive member and an attempt to maintain a satisfactory image quality. Generally, in the case of a photosensitive member which has a photosensitive layer comprising of a pigment and a binding resin, repetition of a process consisting of charging and exposure brings about defects, although the degree of the defects varies. The defects are decrease in chargeability, increase in dark damping, rise in residual potential and poor quality of image. In order to prevent these defects, a measure has been proposed which involving interposing between an electroconductive substrate and a photosensitive body an underlayer containing an organic or inorganic substance. Meanwhile, also in the case of a single-layer photosensitive member consisting of an electroconductive substrate and a single layer, which is laid thereon and has both of electric charge generating function and electric charge transporting function, the interposition of an underlayer between the electroconductive substrate and the overlying layer is being studied.

The object of the underlayer is to prevent the unnecessary injection of charge from an electroconductive substrate, to appropriately maintain the acceptance of charge generated in an charge generating layer at the time of exposure and to improve the adhesion of the photosensitive layer to the substrate. Examples of disclosed underlayers are an underlayer based on a nitrocellulose resin described in JP-A No. 47-6341, an under layer based on a polyamide described in JP-A Nos. 48-47344 and 61-110153), an underlayer based on a vinyl acetate resin described in JP-A No. 48-26141 and an underlayer based on polyvinyl alcohol described in JP-A No. 58-105155. The above-mentioned underlayers, however, require increase in the film thickness in order to sufficiently obtain improvement in chargeability and maintenance of quality of image. The increase in the film thickness of underlayer tends to decrease the sensitivity of the photosensitive member and to increase the residual potential. According to JP-B No. 61-35551 and JP-A No. 59-160,147, an underlayer is provided with a function to move electric charge within the layer by the incorporation of an electron-acceptor substance into the layer. The examples of the electron-acceptor substances disclosed are fluorenone and tetracyanoquinodimethane, which are soluble in a solvent and therefore are associated with a problem that the kind of solvent usable for the coating liquid for the formation of the photosensitive layer is limited. This is because the electron-acceptor substance may be dissolved to enter the photosensitive layer when the photosensitive layer is formed on the underlayer. In order to overcome this problem, JP-A Nos. 63-208853 and 64-3671 disclose an underlayer containing an electron-transferring pigment. However, the performance as an underlayer of this layer, which comprises the electron-transferring pigment dispersed in a resin, tends to vary depending on the state of dispersion of the pigment, and particularly the maintenance of the image quality in repeated use is not always sufficient. In addition, the electron-transferring performance of a conventional electron-transferring pigment is not very satisfactory in terms of high-level chargeability for a long period of time and low-level residual potential in repeated use.

SUMMARY OF THE INVENTION

The object of the present invention is to overcome the problems pertaining to the above-mentioned photosensitive layers and underlayers and to provide an electrographic photosensitive member which maintains a high sensitivity and a high chargeability without a rise in residual potential and therefore produces an excellent image, free of reduction in the density of image and tinting of background after repeated use of the photosensitive member.

The present inventors have achieved the invention based on the discovery that the incorporation of a chlorogallium phthalocyanine substituted with a specific electron-withdrawing group into a photosensitive layer and/or an underlayer leads to an electrographic photosensitive member which assures a high-level electron-transporting function of the photosensitive layer and/or the underlayer, stability in repeated use, and maintenance of an excellent image free of reduction in the density of image or tinting of background for a long period of time.

According to an aspect of the invention, the electrographic photosensitive member contains in a photosensitive layer a chlorogallium phthalocyanine which is substituted with an electron-withdrawing group and has the following formula (I):

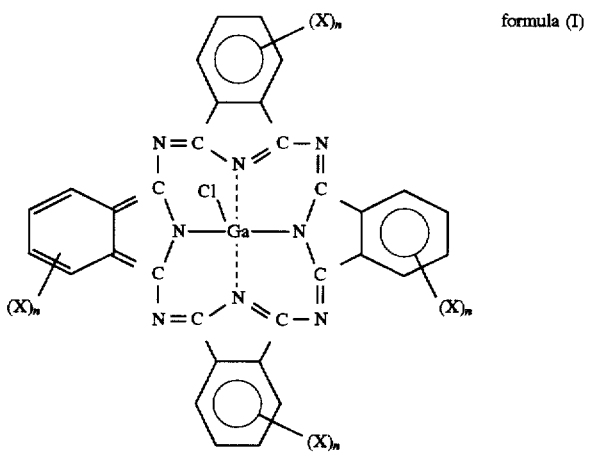

formula (I)

where X represents an electron-withdrawing group and n is an integer of 2 to 4.

According to another aspect of the invention, the electrographic photosensitive member is a laminate electrographic photosensitive member including an electroconductive support, an electric charge generating layer and an electric charge transporting layer, wherein the electric charge generating layer comprises a chlorogallium phthalocyanine, which is substituted with an electron-withdrawing group and is represented by the foregoing formula (I), and a binder resin.

According to still another aspect of the invention, the electrographic photosensitive member is a single-layer electrographic photosensitive member including an electroconductive support and a photoconductive layer, wherein the photoconductive layer comprises a chlorogallium phthalocyanine which is substituted with an electron-withdrawing group and is represented by the foregoing formula (I), and a binder resin.

According to other aspect of the invention, the electrographic photosensitive member includes an underlayer and a photosensitive layer, wherein at least the underlayer contains a chlorogallium phthalocyanine which is substituted with an electron-withdrawing group and is represented by the foregoing formula (I).

In the case of a laminate photosensitive member which belongs to a negatively charged type, the positive charge created in the vicinity of the surface of an electric charge generating layer moves through the electric charge transporting layer to offset the electrostatic charge on the surface of the photosensitive member. The negative charge created at the same time will remain as a residual potential unless the negative charge moves through the electric charge generating layer and reaches the substrate. That is, residual potential rises unless the electric charge generating layer has an electric charge transporting function. The above-described phenomenon is conspicuous in the case of a single-layer photosensitive member, which presents a long travel distance of electron. The chlorophthalocyanine substituted with an electron-withdrawing group, which is used in the present invention, controls the rise in the residual potential, presumably because this chlorophthalocyanine has an electron-transporting function. The chlorophthalocyanine represented by the foregoing formula (I) where n is 1 is not desirable, because electron does not move sufficiently and the above-mentioned effect is hardly obtainable.

BRIEF DESCRIPTION OF THE DRAWINGS

FIG. 1 is a schematically illustrated cross-sectional view of one electrographic photosensitive member of the present invention.

FIG. 2 is a schematically illustrated cross-sectional view of another electrographic photosensitive member of the present invention.

FIG. 3 is a schematically illustrated cross-sectional view of yet another electrographic photosensitive member of the present invention.

FIG. 4 is a schematically illustrated cross-sectional view of still other electrographic photosensitive member of the present invention.

FIG. 24 is an infrared absorption spectrum of a chlorogallium phthalocyanine having an electron-withdrawing substituent which was obtained in Example 4.

FIG. 25 is an infrared absorption spectrum of a chlorogallium phthalocyanine having an electron-withdrawing substituent which was obtained in Example 5.

FIG. 26 is an infrared absorption spectrum of a chlorogallium phthalocyanine having an electron-withdrawing substituent which was obtained in Example 6.

DETAILED DESCRIPTION OF THE INVENTION

Figure 5:
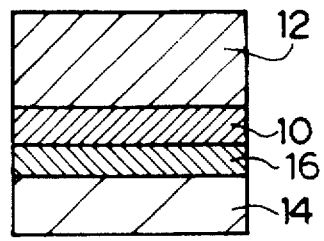
FIG. 5 is a schematically illustrated cross-sectional view of still other electrographic photosensitive member of the present invention.

The present invention will be explained in detail, below.

A chlorogallium phthalocyanine substituted with an electron-withdrawing group which is used in the present invention is represented by the foregoing formula (I). Examples of a preferred electron-withdrawing group X are a halogen atom, a nitro group, a cyano group and a sulfone group. Among these, from the viewpoint of sufficient effect, particularly preferred are a halogen atom, such as a chlorine atom, a fluorine atom and a bromine atom, and a nitro group. A chlorine atom and a fluorine atom are most preferred. The symbol n is related to the electron transporting function and usually in the range of 2 to 4. By the previously mentioned reason, the case where n is 1 is not desirable.

A chlorogallium phthalocyanine substituted with an electron-withdrawing group which is used in the present invention may be prepared by the following known process for preparing a phthalocyanine compound: a phthalonitrile process whereby a phthalonitrile substituted with an electron-withdrawing group and a metal chloride are fused by heating or heated in the presence of an organic solvent, a diiminoisoindoline process whereby a diiminoisoindoline substituted with an electron-withdrawing group and a metal chloride are heated in the presence of an organic solvent, a Weyler process whereby a phthalic anhydride substituted with an electron-withdrawing group, urea and a metal chloride are fused by heating or heated in the presence of an organic solvent, a process whereby a cyanobenzamide substituted with an electron-withdrawing group and a metal salt are reacted at a high temperature and a process whereby a dilithium phthalocyanine substituted with an electron-withdrawing group and a metal salt are reacted.

An organic solvent to be used in the above-mentioned processes for synthesis is preferably inert to the reaction and has a high boiling point. Examples of the solvent are α-chloronaphthalene, β-chloronaphthalene, α-methylnaphthalene, methoxynaphthalene, diphenylethane, ethylene glycol, dialkyl ether, quinoline, sulforane, dichlorobenzene, dichlorotoluene, dimethylformamide, dimethylsulfoxide and dimethylsulfoamide. Accordingly, for example, a chlorogallium phthalocyanine substituted with an electron-withdrawing group which is used in the present invention may be prepared by heating a phthalonitrile substituted with an electron-withdrawing group and a gallium chloride in one of the above-mentioned organic solvents with stirring at a temperature in the range of 140° to 300° C. A diiminoisoindoline substituted with an electron-withdrawing group may be used in place of the phthalonitrile substituted with an electron-withdrawing group.

Since the crystals of chlorogallium phthalocyanine substituted with an electron-withdrawing group, which is prepared by one of the above-mentioned processes, have a large particle size sometimes, the crystals may be comminuted as necessary. Some illustrative non-limiting examples of a comminuting method include a wet grinding method comprising comminuting the crystals obtained by one of the above-mentioned processes utilizing a grinding medium in a solvent in a machine such as a sand mill, a meteor rotary mill, a vibration ball mill, a coball-mill, an attritor or a dyno-mill; a dry grinding method comprising treating the crystals in a machine such as automatic mortar, a meteor rotary mill, a vibration ball mill, a vertical cylindrical vibration mill, a CF mill or a kneader; and a dry grinding method followed by a wet grinding method utilizing a grinding medium. If necessary, a grinding aid, such as sodium chloride or Glauber's salt, may be used, in the case of dry grinding. The time period for dry grinding is preferably not less than 2 hours.

Examples of the solvent to be used in the above-mentioned wet grinding are an aliphatic alcohol, such as methanol, ethanol, n-butanol, n-propanol or iso-propanol, an aromatic alcohol, such as benzyl alcohol, phenetyl alcohol or α-phenylethyl alcohol, an aliphatic polyhydric alcohol, such as glycerin or polyethylene glycol, a phenol, such as phenol, cresol or catechol, an aliphatic amide, such as dimethylformamide or dimethylacetamide, a sulfur derivative, such as dimethylsulfoxide or propane sultone, an ester, such as ethyl acetate or butyl acetate, a ketone, such as methyl ethyl ketone or cyclohexanone, an ether, such as diethyl ether, dimethyl ether or tetrahydrofuran, a halogenated aliphatic hydrocarbon, such as methylene chloride, a halogenated aromatic hydrocarbon, such as chlorobenzene or dichlorobenzene, and water. These solvents may be used alone or in combination of two or more of them.

The amount of the solvent to be used is 1–200 parts by weight, preferably 10–100 parts by weight, per part by weight of chlorogallium phthalocyanine substituted with an electron-withdrawing group. The treating time in the wet grinding process is preferably not less than 3 hours. The treating temperature is in the range of from 0° C. to the boiling point of a solvent to be used and preferably in the range of 10° to 60° C.

If necessary, a chlorogallium phthalocyanine substituted with an electron-withdrawing group which is used in the present invention may be wet-ground in a solvent following the dry-grinding treatment. The examples of a solvent which may be used in the wet grinding process are disclosed in JP-A Nos. 5-98181 and 5-194523. These solvents are an aliphatic alcohol, such as methanol, ethanol, n-butanol, n-propanol or iso-propanol, an aromatic alcohol, such as benzyl alcohol, phenetyl alcohol or α-phenylethyl alcohol, an aliphatic polyhydric alcohol, such as glycerin or polyethylene glycol, a phenol, such as phenol, cresol or catechol, an aliphatic amide, such as dimethylformamide or dimethylacetamide, a sulfur derivative, such as dimethylsulfoxide or propane sultone, an ester, such as ethyl acetate or butyl acetate, a ketone, such as methyl ethyl ketone or cyclohexanone, an ether, such as diethyl ether, dimethyl ether or tetrahydrofuran, a halogenated aliphatic hydrocarbon, such as methylene chloride, a halogenated aromatic hydrocarbon, such as chlorobenzene or dichlorobenzene, and water. These solvents may be used alone or in combination of two or more of them. Some illustrative non-limiting examples of an apparatus for wet-grinding treatment are a ball mill, an attritor, a roll mill, a coball-mill, a sand mill and a homogenizing mixer. The amount of the solvent to be used is 1–200 parts by weight, preferably 10–100 parts by weight, per part by weight of chlorogallium phthalocyanine substituted with an electron-withdrawing group. The wet-treating time is preferably not less than 3 hours. The treating temperature is in the range of from 0° C. to the boiling point of a solvent to be used and preferably in the range of 10° to 60° C.

Among the crystalline substances which have undergone the above-mentioned treatments, preferred are a crystalline substance in which n is 2 and X is chlorine and Bragg angle(2 θ±0.2°) of which exhibits a peak at 26.8° or at 26.0° to 27.5°, a crystalline substance in which n is 2 and X is fluorine and Bragg angle(2 θ±0.2°) of which exhibits peaks at 7.0°, 15.2° and 27.1° or at 6.8°, 15.3°, 16.4°, 27.2° and 28.9° or at 6.8°, 15.5°, 16.5°, 27.4° and 30.1°, and a crystalline substance in which n is 4 and X is chlorine and Bragg angle (2 θ±0.2°) of which exhibits peaks at 21.3°, 23.0°, 24.9°, 26.1°, 30.7° and 31.3° or at 24.5° to 26.5° in X-ray diffraction spectrum obtained by using Cu-Kα (λ=1.54 Å) as an X-ray source.

Besides, depending on the property required for a photosensitive member, two or more types of chlorogallium phthalocyanines substituted with an electron-withdrawing group may be used.

Next, the explanation is directed to an electrographic photosensitive member which has a photosensitive layer and/or an underlayer utilizing, as a photoconductive material, a chlorogallium phthalocyanine substituted with an electron-withdrawing group obtained in the above-mentioned treatment. The electrographic photosensitive member according to the present invention may have a single photosensitive layer or may have a laminate-structure having an electric charge generating layer and an electric charge transporting layer, which are function-divided. Further, an outermost layer may be added as a protective layer.

An aspect of the electrographic photosensitive member of the present invention is a laminate electrographic photosensitive member, which laminate photosensitive member includes an electroconductive support, a charge generating layer and an electric charge transporting layer, wherein the charge generating layer comprises a chlorogallium phthalocyanine which is substituted with an electron-withdrawing group and is represented by the foregoing formula (I), and a binder resin. In the case where the photosensitive layer has a laminate construction, the electric charge generating layer comprises the above-mentioned chlorogallium phthalocyanine substituted with an electron-withdrawing group and a binder resin. FIGS. 1 and 3 are each a schematically illustrated cross-sectional view of one electrographic photosensitive member having no underlayer, according to the invention. In FIG. 1, an electroconductive support 14 is coated with photosensitive layers consisting of an electric charge generating layer 10 and an electric charge transporting layer 12 laminated over the electric charge generating layer 10. In FIG. 2, an underlayer 16 is interposed between an electric charge generating layer 10 and an electroconductive support 14. In FIG. 3, a photosensitive layer is coated with a protective layer 18. In FIG. 4, an underlayer 16 and a protective layer 18 are laminated.

Figure 6:
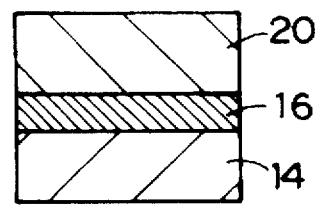
FIG. 6 is a schematically illustrated cross-sectional view of still other electrographic photosensitive member of the present invention.
Figure 7:
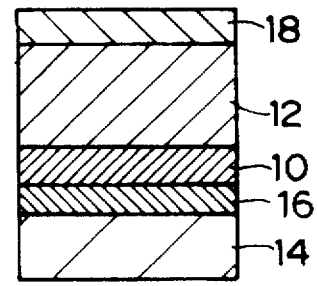
FIG. 7 is a schematically illustrated cross-sectional view of still other electrographic photosensitive member of the present invention.
Figure 8:
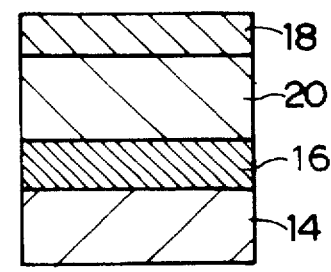
FIG. 8 is a schematically illustrated cross-sectional view of still other electrographic photosensitive member of the present invention.

According to an aspect of the present invention, the electrographic photosensitive member includes an underlayer and a photosensitive layer on an electroconductive substrate, wherein at least the underlayer contains a chlorogallium phthalocyanine which is substituted with an electron-withdrawing group and is represented by the foregoing formula (I), and a binder resin. In this case, the chlorogallium phthalocyanine substituted with an electron-withdrawing group is contained preferably only in the underlayer, but it may be contained in both of the underlayer and the photosensitive layer. FIGS. 5 through 8 are each a schematically illustrated cross-sectional view of one electrographic photosensitive member having the above-mentioned underlayer of the present invention. In FIG. 5, an underlayer 16 is interposed between laminate photosensitive layers, which comprises an electric charge generating layer 10 and an electric charge transporting layer 12 laminated over the electric charge generating layer 10, and an electroconductive support 14. In FIG. 6, an underlayer 16 is interposed between a single-layer photosensitive layer 20, which has an electric charge generating function and an electric charge transporting function therein, and an electroconductive support 14. In FIG. 7, the photosensitive layer of the photosensitive member of FIG. 5 is coated with a protective layer 18. In FIG. 8, the photosensitive layer of the photosensitive member of FIG. 6 is coated with a protective layer 18. The above-mentioned layers 10 through 20 will be explained in detail below.

The electric charge generating layer 10 of the electrographic photosensitive member according to the present invention is formed by means of preparing a coating liquid by dispersing the aforementioned chlorogallium phthalocyanine substituted with an electron-withdrawing group in a solution comprising a binder resin dissolved in an organic solvent and then applying the liquid to an electroconductive support 14 or to an underlayer 16 in FIGS. 1 through 4. The resin to be used may be selected from a wide range of resins. Preferred resins are insulating resins including a polyvinyl acetal resin, such as a polyvinyl formal resin, a polyvinyl butyral resin or a polyvinyl butyral resin partially acetalized with formal or acetoacetal, a polyarylate (a polycondensation product made from bisphenol A and phthalic acid), a polycarbonate resin, a polyester resin, a modified polyether-type polyester resin, a phenoxy resin, a polyvinyl chloride resin, a polyvinylidene chloride resin, a polyvinyl acetate resin, a polystyrene resin, an acrylic resin, a methacrylic resin, a polyacrylamide resin, a polyamide resin, a polyvinyl pyridine resin, a cellulose-based resin, a polyurethane resin, an epoxy resin, a silicone resin, a polyvinyl alcohol resin, a polyvinyl pyrrolidone resin, casein, a vinylchloride/vinylacetate copolymer, a hydroxyl-modified vinylchloride/vinylacetate copolymer, a carboxyl-modified vinylchloride/vinylacetate copolymer, a vinylchloride/vinylacetate/maleic anhydride copolymer, a styrene/butadiene copolymer, a vinylidene chloride/acrylonitrile copolymer, a styrene/alkyd resin, a silicone/alkyd resin and a phenol/formaldehyde resin. In addition, other preferred resin is an organic photoconductive polymer such as poly-N-vinyl carbazole, polyvinyl anthracene or a polyvinyl pyrene. Among the foregoing resins, particularly preferred is at least one resin selected from the group consisting of polyvinyl acetal resin, a polyarylate resin, an acrylic resin and a methacrylic resin. However, the binder resin is not limited to the above-mentioned insulating resins or to the above-mentioned organic photoconductive polymers. These binder resins may be used alone or in combination of two or more of them.

As a solvent that dissolves a binder resin, usable are an alcohol, such as methanol, ethanol, n-propanol or isopropanol, n-butanol or benzyl alcohol, a ketone, such as acetone, MEK or cyclohexanone, an amide, such as DMF or dimethylacetoamide, a sulfoxide, such as dimethylsulfoxide, a cyclic or linear ether, such as THF, dioxane, diethyl ether, methyl cellosolve or ethyl cellosolve, an ester, such as methyl acetate, ethyl acetate or n-butyl acetate, a halogenated aliphatic hydrocarbon, such as methylene chloride, chloroform, carbon tetrachloride, dichloroethylene or trichloroethylene, a mineral oil, such as ligroin, an aromatic hydrocarbon, such as benzene, toluene and xylene, and a halogenated aromatic hydrocarbon, such as chlorobenzene or dichlorobenzene. These solvents may be used alone or in combination of two or more of them.

The weight ratio of the chlorogallium phthalocyanine substituted with an electron-withdrawing group to the binder resin is in the range of 40:1 to 1:20 and preferably in the range of 10:1 to 1:10. In the case where the proportion of the chlorogallium phthalocyanine substituted with an electron-withdrawing group is too high, the stability of the coating liquid becomes worse, whereas in the case where the proportion of the chlorogallium phthalocyanine substituted with an electron-withdrawing group is too low, the sensitivity of the photosensitive member becomes worse. Therefore, the ratio is preferably is set within the above-mentioned range. In order to disperse the chlorogallium phthalocyanine substituted with an electron-withdrawing group, any of known methods may be adopted which uses a machine such as a ball mill, a sand grinding mill, a meteor mill, a coball-mill or a roll mill. A method for blending the binder resin with the chlorogallium phthalocyanine substituted with an electron-withdrawing group may be any of the following examples: a powder or a polymer solution of the binder resin is added to the chlorogallium phthalocyanine substituted with an electron-withdrawing group while the phthalocyanine is being dispersed; a dispersion of the chlorogallium phthalocyanine substituted with an electron-withdrawing group is added to a polymer solution of the binder resin; or a polymer solution of the binder resin is added to a dispersion of the chlorogallium phthalocyanine substituted with an electron-withdrawing group. The above-mentioned dispersing method needs to meet the condition that should not change the crystal form of the chlorogallium phthalocyanine substituted with an electron-withdrawing group. In this regard, it has been made sure that any of the dispersing methods adopted herein does not cause the change in crystal form between pre-dispersion and post-dispersion.

Examples of the coating methods of the coating liquid are immersion coating, spray coating, spinner coating, bead coating, wire bar coating, blade coating, roller coating, air knife coating, curtain coating and the like. Preferably, the coated liquid is dried at room temperature, and then dried by heating at 30° to 200° C. for 5 minutes to 2 hours in a still atmosphere or under air blow. Normally, the electric charge generating layer 10 has a thickness in the range of 0.05 to 5 μm and preferably in the range of 0.15 to 2.0 μm. In the case where the thickness is below 0.05 μm, it is difficult to obtain a sufficient sensitivity to light, whereas in the case where the thickness is over 5 μm, the level of dark damping undesirably increases.

In the case of a laminate construction (FIGS. 5 and 7) of photosensitive member including an under layer 16, an electric charge generating layer 10 is formed by the steps of dispersing an electric charge generating substance in a binder resin to produce a dispersion liquid and then coating the underlayer with the dispersion liquid, wherein examples of the electric charge generating substance are an azo pigment, such as Sudan red, Dian blue or Jesna green B, a quinone pigment, such as Algol yellow, pyrene quinone or Indanthrene brilliant violet RRP, a quinocyane pigment, a perylene pigment, such as benzimidazole perylene, an indigo dye, such as indigo or thioindigo, a pthalocyanine pigment, such as titanyloxy phthalocyanine, chlorogallium phthalocyanine, hydroxygallium phthalocyanine or metal-free phthalocyanine and a quinacridone pigment and wherein examples of the binder resin are a polyvinyl acetal resin, such as a polyvinyl butyral resin or a polyvinyl butyral resin partially acetalized with formal or acetoacetal, a polyarylate resin (a polycondensation product made from bisphenol A and phthalic acid), a vinylchloride/vinylacetate copolymer and a hydroxyl-modified vinylchloride/vinylacetate copolymer. The weight ratio of the electric charge generating substance to the binder resin is in the range of 40:1 to 1:20 and preferably in the range of 10:1 to 1:10.

In an electrographic photosensitive member of the present invention, an electric charge transporting layer 12 is produced by incorporating into an appropriate binder resin an electric charge transporting material, which is, for example, an electron donor substance selected from an oxadiazole derivative, such as 2,5-bis(p-diethylaminophenyl)-1,3,4-oxadiazole, a pyrazoline derivative, such as 1,3,5-triphenyl pyrazoline or 1-[pyridyl-(2)]-3-(p-diethylaminostylyl)-5-(p-diethylaminophenyl)pyrazoline, an aromatic tertiary monoamino compound, such as triphenyl amine or benzyl aniline, an aromatic tertiary diamino compound, such as N,N'-diphenyl-N,N'-bis(m-tolyl)benzidine, a 1,2,4-triazine derivative, such as 3-(p-diethylaminophenyl)-5,6-di-(p-methoxyphenyl)-1,2,4-triazine, a hydrazone derivative, such as 4-diethylaminobenzaldehyde-2,2-diphenylhydrazone, a quinazoline derivative, such as 2-phenyl-4-stylylquinazoline, a benzofuran derivative, such as 6-hydroxy-2,3-di-(p-methoxyphenyl)benzofuran, an α-stilbene derivative, such as p-(2,2-diphenylvinyl)-N,N-diphenylaniline, a triphenylmethane derivative and a polymer having as a main or side chain a group corresponding to any of the foregoing compounds. However, the electric charge transporting material is not limited to the above-mentioned substances. The electric charge transporting materials may be used alone or in a combination of two or more of them. In addition, the electric charge transporting material by itself may form a layer, in the case where the electric charge transporting material is a polymer.

As for a binder resin which forms the electric charge transporting layer 12, the same resin as that intended for forming the aforementioned electric charge generating layer 10 may be used. Examples of a binder resin which forms the electric charge transporting layer 12 are a polycarbonate resin, a polyester resin, a methacrylic resin, an acrylic resin, a polyvinyl chloride resin, a polyvinylidene chloride resin, a polystyrene resin, a polyvinyl acetate resin, a styrene/butadiene copolymer, a vinylidene chloride/acrylonitrile copolymer, a vinylchloride/vinylacetate copolymer, a vinylchloride/vinylacetate/maleic anhydride copolymer, a silicone resin, a silicone/alkyd resin, a phenol/formaldehyde resin, a styrene/alkyd resin and poly-N-vinylcarbazole resin. The electric charge transporting layer 12 can be formed by means of applying a coating liquid, which is prepared by use of the above-mentioned resin and the same organic solvent as that intended for the preparation of the electric charge generating layer 10, in the same manner as in the aforementioned coating method. In this case, the ratio of the electric charge transporting substance to the binder resin is in the range of 5 to 500 parts by weight of the electric charge transporting substance to 100 parts by weight of the binder resin. The film thickness of the electric charge transporting layer 12 is generally in the range of 5 to 50 μm and preferably in the range of 10 to 30 μm.

An aspect of the electrographic photosensitive member of the present invention is a single-layer body, which single-layer photosensitive member includes an electroconductive support and a photoconductive layer, wherein the photoconductive layer comprises a chlorogallium phthalocyanine which is substituted with an electron-withdrawing group and is represented by the foregoing formula (I), and a binder resin. In the present invention, in the case where the photosensitive layer has a single-layer construction, the photosensitive layer is a photoconductive layer containing a chlorogallium phthalocyanine substituted with an electron-withdrawing group dispersed in a binder resin. The photosensitive layer may contain an electric charge transporting substance. The same binder resin and the same electric charge transporting substance as in the above are used and the photoconductive layer is formed in the same manner as in the above. In this case, the binder resin is preferably at least one resin selected from the group consisting of a polyvinyl acetal resin, a vinylchloride/vinylacetate copolymer, a pheoxy resin, a modified ether-based polyester resin, a polyarylate resin, an acrylic resin and a methacrylic resin. Most preferably, the resin is at least one resin selected from the group consisting of a vinylchloride/vinylacetate copolymer, polyvinyl acetal resin, a polyarylate resin, an acrylic resin and a methacrylic resin. If necessary, the photosensitive layer may contain an additive such as an antioxidant or a sensitizer. The weight ratio of the chlorogallium phthalocyanine substituted with an electron-withdrawing group to the binder resin is in the range of 40:1 to 1:20 and preferably in the range of 10:1 to 1:10. In the case where the proportion of the chlorogallium phthalocyanine substituted with an electron-withdrawing group is too high, the stability of the coating liquid becomes worse, whereas in the case where the proportion of the chlorogallium phthalocyanine substituted with an electron-withdrawing group is too low, the sensitivity of the photosensitive member becomes worse. Therefore, the ratio is preferably set within the above-mentioned range. In the case where an electric charge transporting substance is contained, the weight ratio of the electric charge transporting substance to the binder resin is preferably in the range of 1:20 to 5:1 and the weight ratio of the electric charge generating substance to the electric charge transporting substance is preferably in the range of 1:10 to 10:1. The film thickness of the photoconductive layer is generally in the range of 5 to 50 μm and preferably in the range of 10 to 40 μm. A film thickness out of this range is not desirable, because the chargeability drops in the case where the thickness is below 5 μm, whereas the residual potential will rise in the case where thickness is above 50 μm.

In FIGS. 6 and 8, a single-layer photosensitive member 20, which has an underlayer, has the above-described construction.

In the present invention, an underlayer 16 is produced by dispersing a chlorogallium phthalocyanine substituted with an electron-withdrawing group in a binder resin. As a binder resin, use may be made of a thermoplastic resin such as polyester resin, a polystyrene resin, a polycarbonate resin, a polyacrylate resin, a polyvinyl butyral resin, a polyvinyl acetate resin, an ethyl cellulose resin, a polysulfone resin or a polyvinyl carbazole resin. As necessary, a thermosetting resin may be used. For example, a thermosetting resin is prepared by reacting an isocyanate-containing compound, such as tolylene isocyanate or hexamethylene diisocyanate, and a bisphenol A-derived epoxy resin under heating. As a solvent that dissolves a binder resin, usable are an alcohol, such as methanol, ethanol, n-propanol or iso-propanol, n-butanol or benzyl alcohol, a ketone, such as acetone, MEK or cyclohexanone, an amide, such as DMF or dimethylformamide, a sulfoxide, such as dimethylsulfoxide, a cyclic or linear ether, such as THF, dioxane, diethyl ether, methyl cellosolve or ethyl cellosolve, an ester, such as methyl acetate, ethyl acetate or n-butyl acetate, a halogenated aliphatic hydrocarbon, such as methylene chloride, chloroform, carbon tetrachloride, dichloroethylene or trichloroethylene, a mineral oil, such as ligroin, an aromatic hydrocarbon, such as benzene, toluene and xylene, and a halogenated aromatic hydrocarbon, such as chlorobenzene or dichlorobenzene. These solvents may be used alone or in combination of two or more of them. The amount of the chlorogallium phthalocyanine to be used is in the range of 3 to 100 parts by weight, preferably in the range of 5 to 70 parts by weight, per 10 parts of the binder resin. As for the method of dispersing the chlorogallium phthalocyanine substituted with an electron-withdrawing group in the resin, any of known methods may be adopted which uses a machine such as a ball mill, a sand grinding mill, a meteor mill, a coball-mill or a roll mill. The above-mentioned dispersing method needs to meet the condition that should not change the crystal form of the chlorogallium phthalocyanine substituted with an electron-withdrawing group. In this regard, it has been made sure that any of the dispersing methods adopted herein does not cause the change in crystal form between pre-dispersion and post-dispersion.

In the present invention, the film thickness of the underlayer is in the range of 0.05 to 12.0 μm and preferably in the range of 0.1 to 10.0 μm. In the case where the thickness is below 0.5 μm, it is difficult to obtain a uniform thickness, whereas in the case where the thickness is above 12.0 μm, the residual potential will rise during the use for a long period of time. Since the chlorogallium phthalocyanine substituted with an electron-withdrawing group, which is adopted in the present invention, is excellent in electric charge transporting capability, the resistivity of the underlayer may be higher than the values of $10^5$ to $10^{14}$ Ω·cm of underlayers hitherto disclosed, and the preferred resistivity is in the range of $10^6$ to $10^{16}$ Ω·cm.

Between the electroconductive support 14 and the photosensitive layer, there may be interposed an underlayer which is out of the scope defined by the present invention and which does not use a chlorogallium phthalocyanine substituted with an electron-withdrawing group. Examples of such an underlayer are an inorganic layer, such as an anodized aluminum film, oxidized aluminum or hydroxylated aluminum, an organic layer, such as polyvinyl alcohol, casein, polyvinyl pyrrolidone, polyacrylic acid, cellulose, gelatin, polyglutamic acid, starch, aminostarch, polyurethane, polyimide or polyamide, an organometallic compound, such as a zirconium chelate compound, a zirconium alkoxide compound, a titanyl chelate compound or a titanyl alkoxide compound, and a silane coupling agent. The film thickness of the underlayer is in the range of 0.01 to 20 μm and the most effective thickness is in the range of 0.05 to 10 μm.

Any support usable in an electrographic photosensitive member can be used as an electroconductive support 14. More concretely, the electroconductive support 14 can be made from a metal, such as aluminum, nickel, chromium or stainless steel, a plastic film coated with a thin film of such material as aluminum, titanium, nickel, chromium, stainless steel, gold, vanadium, tin oxide, indium oxide or indium/tin oxide (ITO), or a paper or plastic film coated or impregnated with an electric conductivity imparting agent. In addition, in so far as no deleterious effect is exerted to the image to be formed, the surface of the electroconductic support 14 may be treated. This surface treatment may include an oxidation, a chemical treatment, a coloring treatment and an irregular reflection generating treatment such as sanding.

Further, if necessary, the photosensitive layer is coated with a protective layer 18. The protective layer is produced by incorporating an electroconductive substance into an appropriate binder resin. Some illustrative non-limiting examples of these usable electroconductive substances include a metallocene compound, such as dimethyl ferrocene, an aromatic amino compound, such as N,N'-diphenyl-N,N'-bis-(m-tolyl)benzidine, and an metal oxide, such as antimony oxide, tin oxide, titanium oxide, indium oxide or tin oxide/antimony oxide. The binder resin to be used in the protective layer may be any of the aforementioned binder resins. The protective layer preferably has its resistivity in the range of $10^9$ to $10^{14}$ Ω·cm. In the case where the resistivity is higher than $10^{14}$ Ω·cm, the residual potential rises to an extent that the obtained copy has serious fog. On the other hand, in the case where the resistivity is lower than $10^9$ Ω·cm, the encountered problem is blurred image and reduction in resolution. Besides, the protective layer should have a construction that does not virtually hinder the transmission of resolving light at the time of irradiation. The film thickness of the protective layer is in the range of 0.5 to 20 μm and preferably in the range of 1 to 10 μm.

The electrographic photosensitive member according to the present invention can be utilized, by the selection of its layers, not only for a copying machine in electrostatic photography but also in such applications as a laser beam printer and as a photosensitive member for engraving system by electrostatic photography.

EXAMPLES

The present invention will be further explained by way of examples below. However, the present invention is not limited to these examples. "Part" in Examples and Comparative Examples means weight part.

Synthesis Example 1

Synthesis of 2,3,6,7,10,11,14,15-octachloro-chlorogallium phthalocyanine

Figure 9:
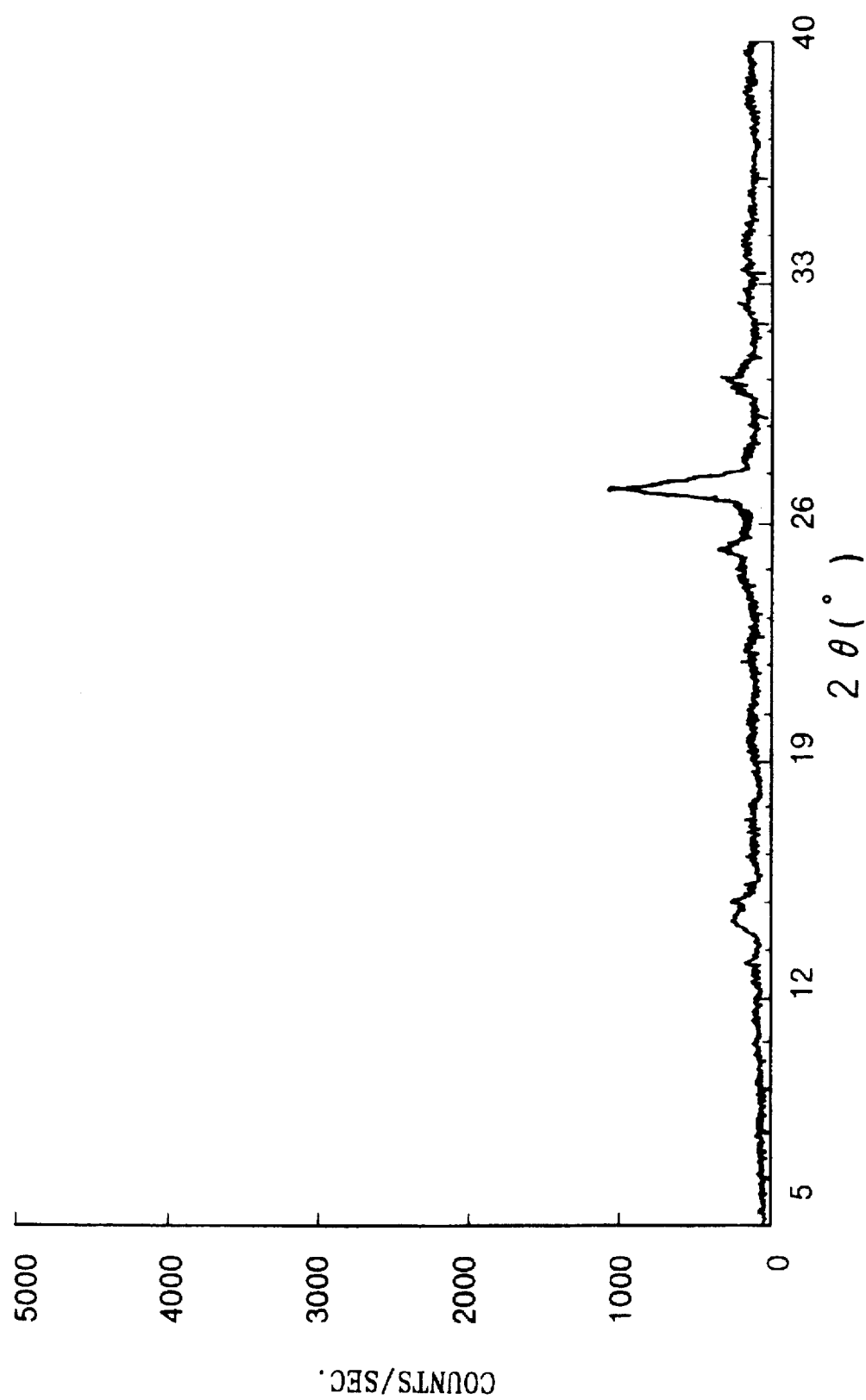
FIG. 9 is a powder X-ray diffraction spectrum of a chlorogallium phthalocyanine having an electron-withdrawing substituent which was obtained in Synthesis Example 1.
Figure 18:
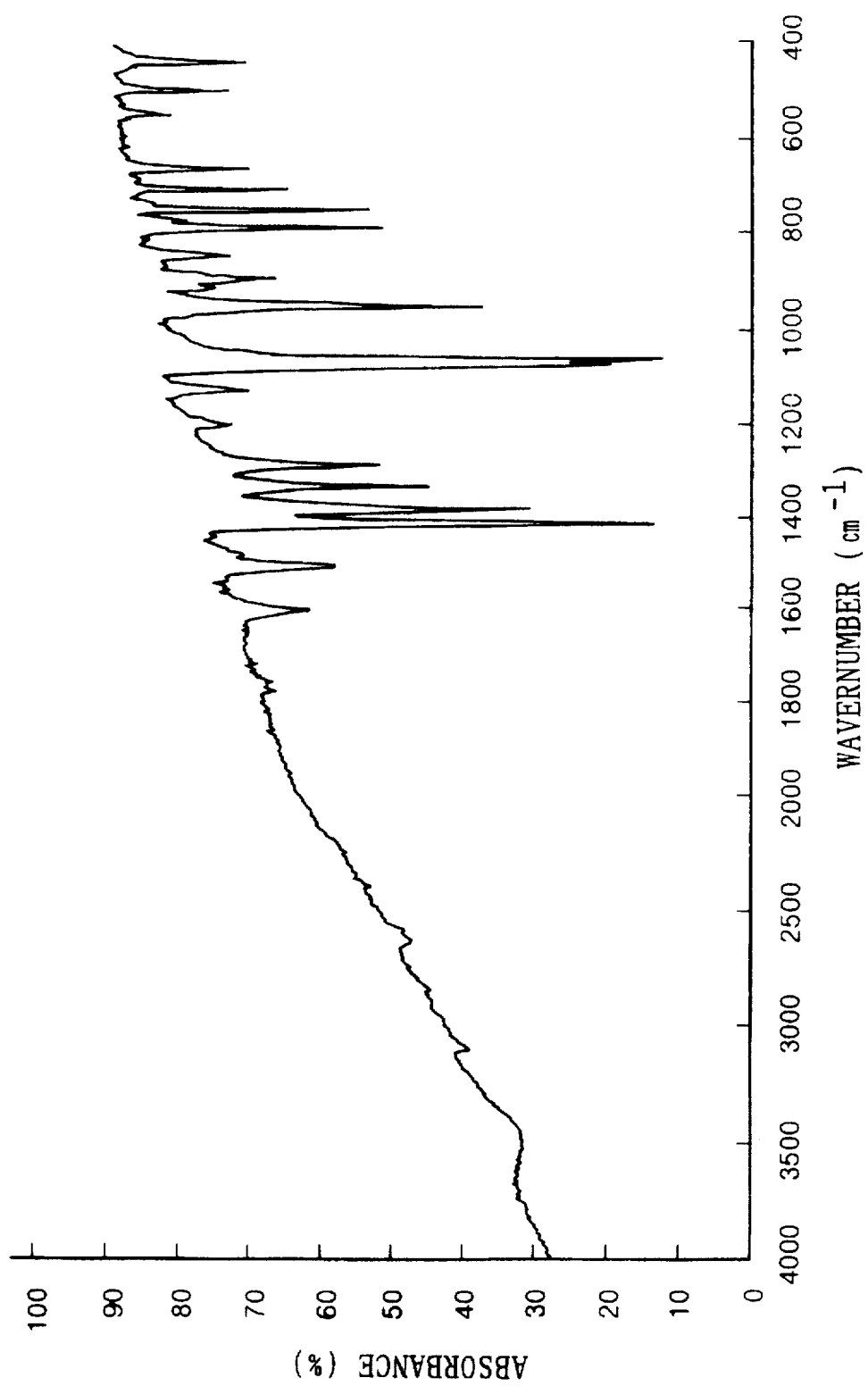
FIG. 18 is an infrared absorption spectrum of a chlorogallium phthalocyanine having an electron-withdrawing substituent which was obtained in Synthesis Example 1.

Ten parts of 4,5-dichloro-phthalonitrile was dispersed in 20 parts of α-chloro-naphthalene in a nitrogen atmosphere at room temperature. To this dispersion, there were added 2.3 parts of gallium trichloride together with 45 parts of α-chloronaphthalene, and the mixture was reacted at 200° C. for 6 hours. Then, the product was subjected to hot filtration and washed with DMSO and with methanol. The wet cake was dried under reduced pressure to obtain 6.9 parts of 2,3,6,7,10,11,14,15-octachloro-chlorogallium phthalocyanine (hereinafter referred to as 8Cl-ClGaPc). A powder X-ray diffraction spectrum (hereinafter referred to as X-ray spectrum), which was measured by use of Rotaflex model CN2726A1 manufactured by Rigaku Denki Co., Ltd. under the condition of a tube voltage of 40 kV and a tube current of 30 mA by Cu-Kα as an X-ray source, is shown in FIG. 9. Meanwhile, infrared absorption spectrum (hereinafter referred to as IR spectrum), which was measured by use of Infrared Spectrophotometer model 270-30 manufactured by Hitachi, Ltd., is shown in FIG. 18. The IR spectrum demonstrates that the obtained compound was 8Cl-ClGaPc.

Synthesis Example 2

Synthesis of 2,3,6,7,10,11,14,15-octafluoro-chlorogallium phthalocyanine

Figure 10:
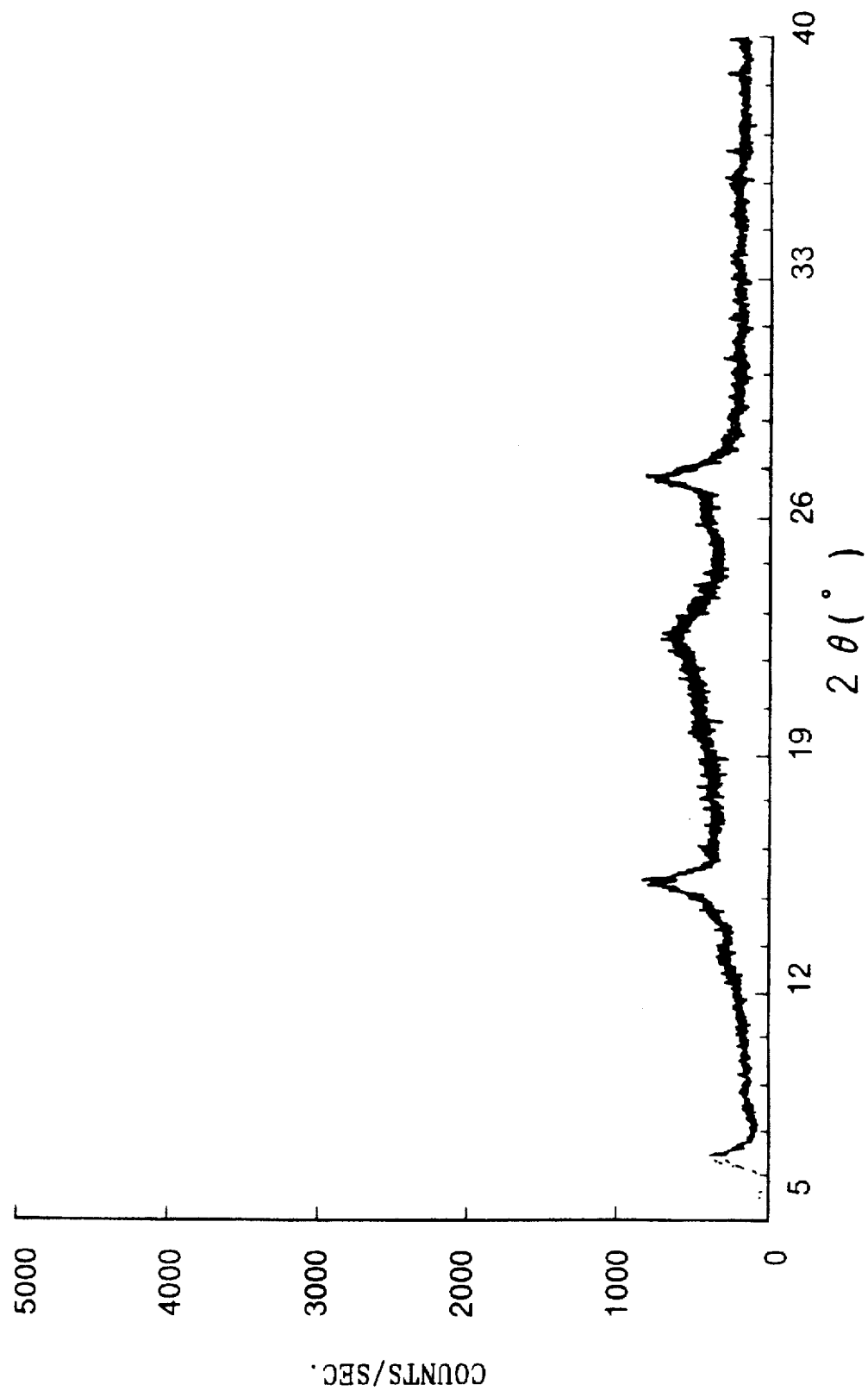
FIG. 10 is a powder X-ray diffraction spectrum of a chlorogallium phthalocyanine having an electron-withdrawing substituent which was obtained in Synthesis Example 2.
Figure 19:
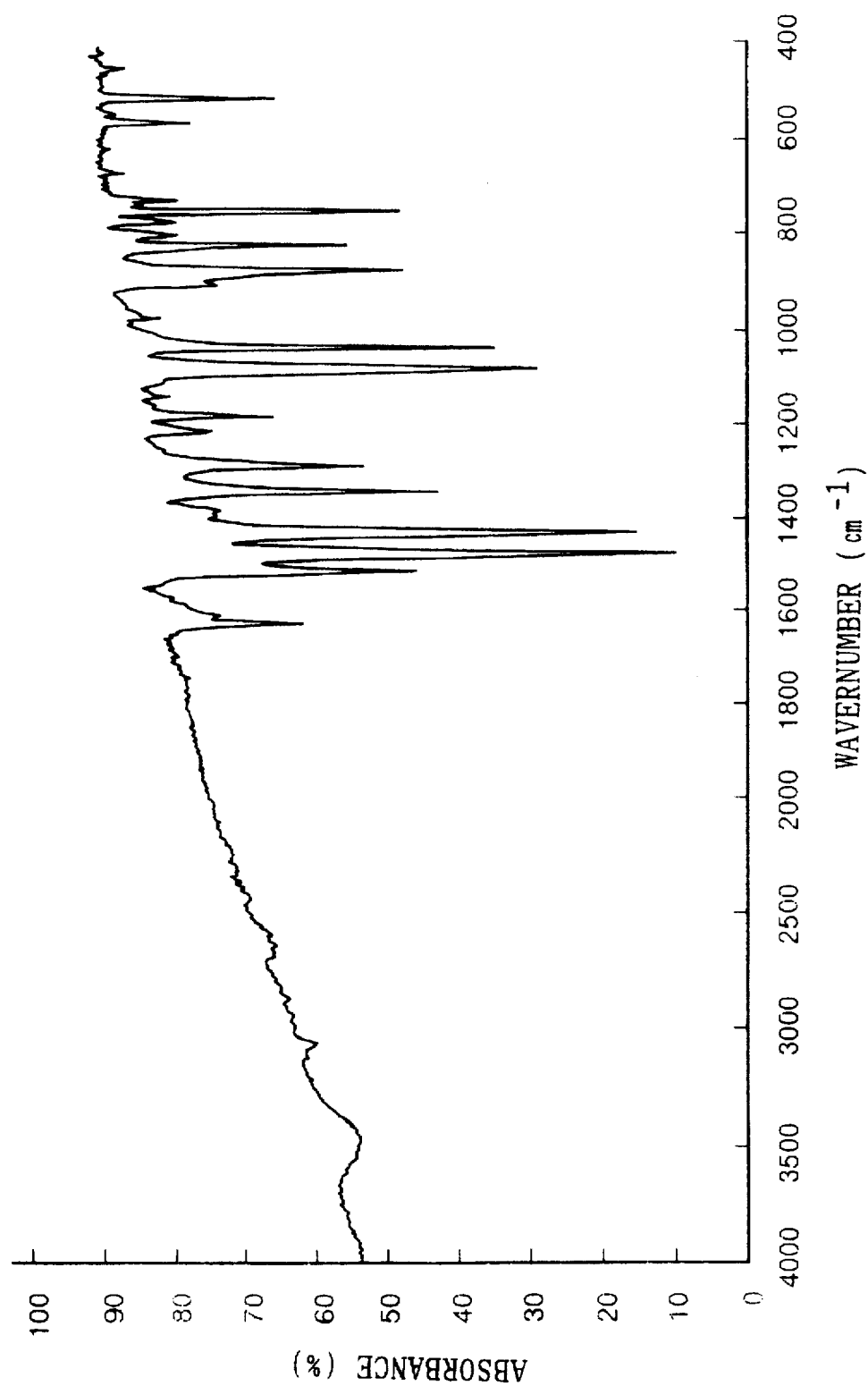
FIG. 19 is an infrared absorption spectrum of a chlorogallium phthalocyanine having an electron-withdrawing substituent which was obtained in Synthesis Example 2.

Ten parts of 4,5-difluoro-phthalonitrile was dispersed in 20 parts of α-chloro-naphthalene in a nitrogen atmosphere at room temperature. To this dispersion, there were added 2.7 parts of gallium trichloride together with 45 parts of α-chloro-naphthalene, and the mixture was reacted at 200° C. for 5 hours. Then, the product was subjected to hot filtration and washed with DMSO and with methanol. The wet cake was dried under reduced pressure to obtain 8.7 parts of 2,3,6,7,10,11,14,15-octafluoro-chlorogallium phthalocyanine (hereinafter referred to as 8F-ClGaPc) The X-ray spectrum of the obtained compound is shown in FIG. 10 and the IR spectrum of the obtained compound is shown in FIG. 19. The IR spectrum demonstrates that the obtained compound was 8F-ClGaPc.

Synthesis Example 3

Synthesis of hexadecachloro-chlorogallium phthalocyanine

Figure 11:
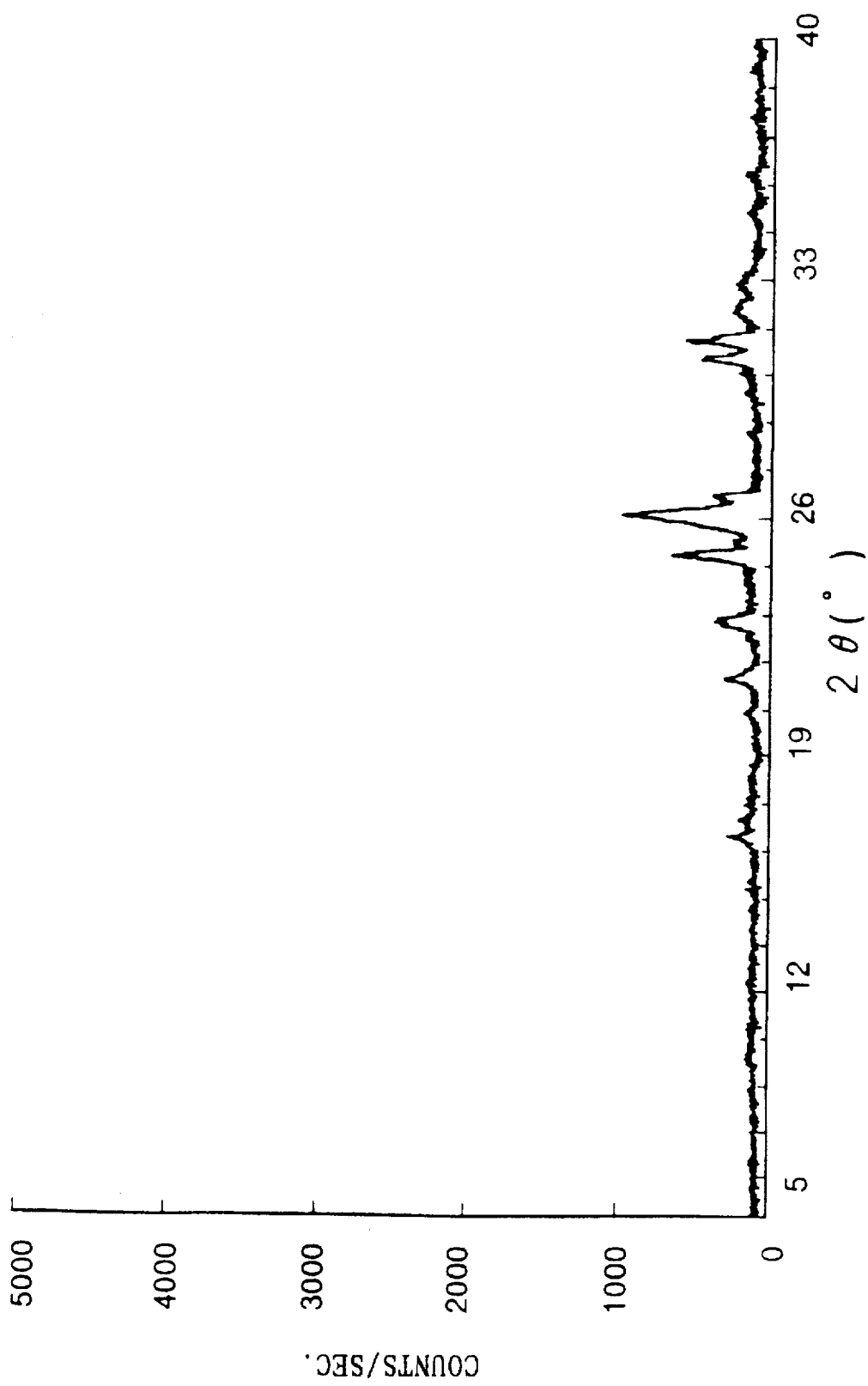
FIG. 11 is a powder X-ray diffraction spectrum of a chlorogallium phthalocyanine having an electron-withdrawing substituent which was obtained in Synthesis Example 3.
Figure 20:
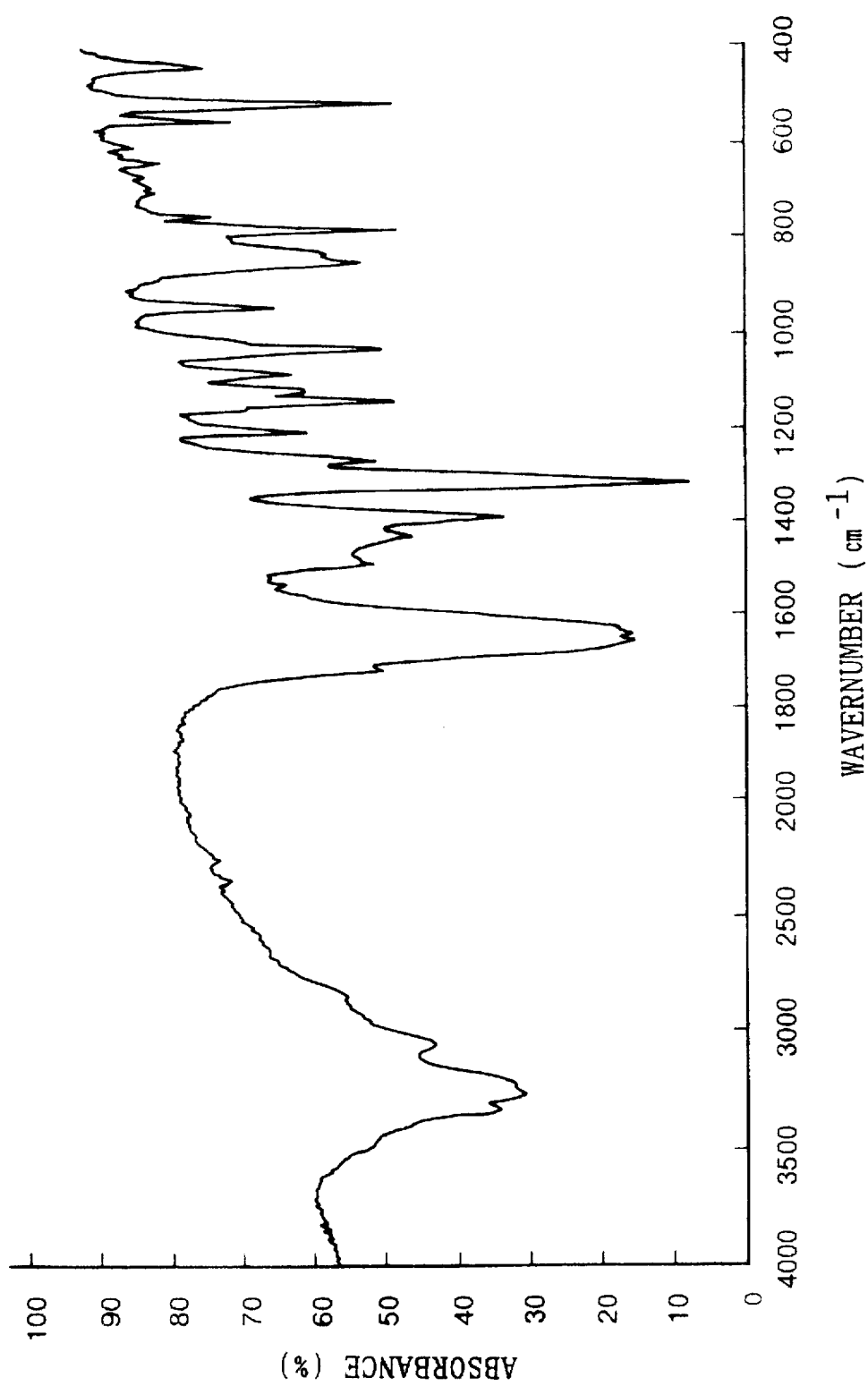
FIG. 20 is an infrared absorption spectrum of a chlorogallium phthalocyanine having an electron-withdrawing substituent which was obtained in Synthesis Example 3.

Eighty parts of urea, 6 parts of boric acid and 64.9 parts of tetrachlorophthalic acid anhydride were dispersed in 100 parts of α-chloro-naphthalene in a nitrogen atmosphere at room temperature. To this dispersion, there were added 10 parts of gallium trichloride together with 50 parts of α-chloro-naphthalene, and the mixture was reacted at 220° C. for 5 hours. Then, the product was subjected to hot filtration and washed with DMSO and with methanol. The wet cake was dried under reduced pressure to obtain 24.3 parts of hexadecachloro-chlorogallium phthalocyanine (hereinafter referred to as 16C-ClGaPc). The X-ray spectrum of the obtained compound is shown in FIG. 11 and the IR spectrum of the obtained compound is shown in FIG. 20. The IR spectrum demonstrates that the obtained compound was 16C-ClGaPc.

Examples 1–3

Figure 12:
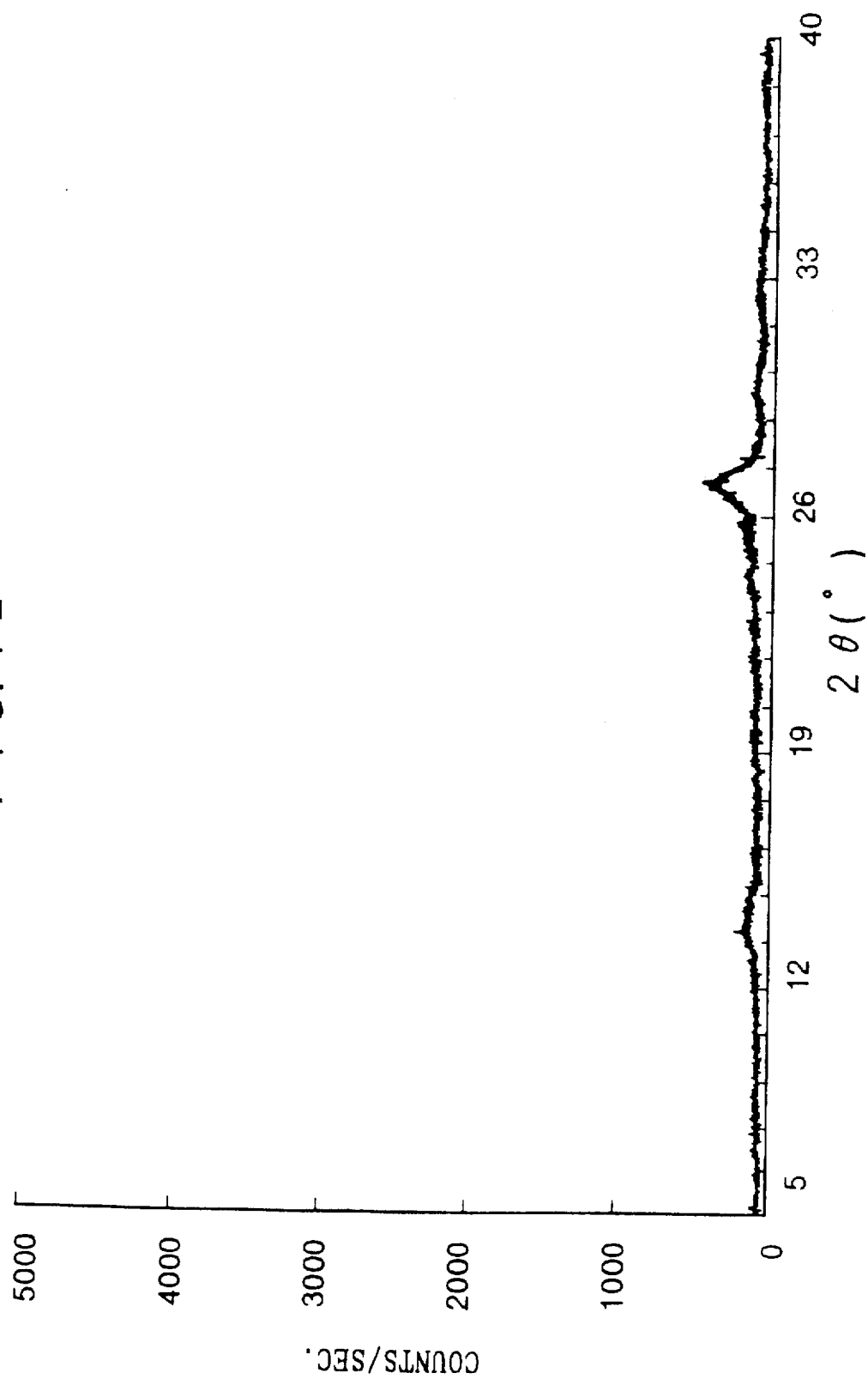
FIG. 12 is a powder X-ray diffraction spectrum of a chlorogallium phthalocyanine having an electron-withdrawing substituent which was obtained in Example 1.
Figure 13:
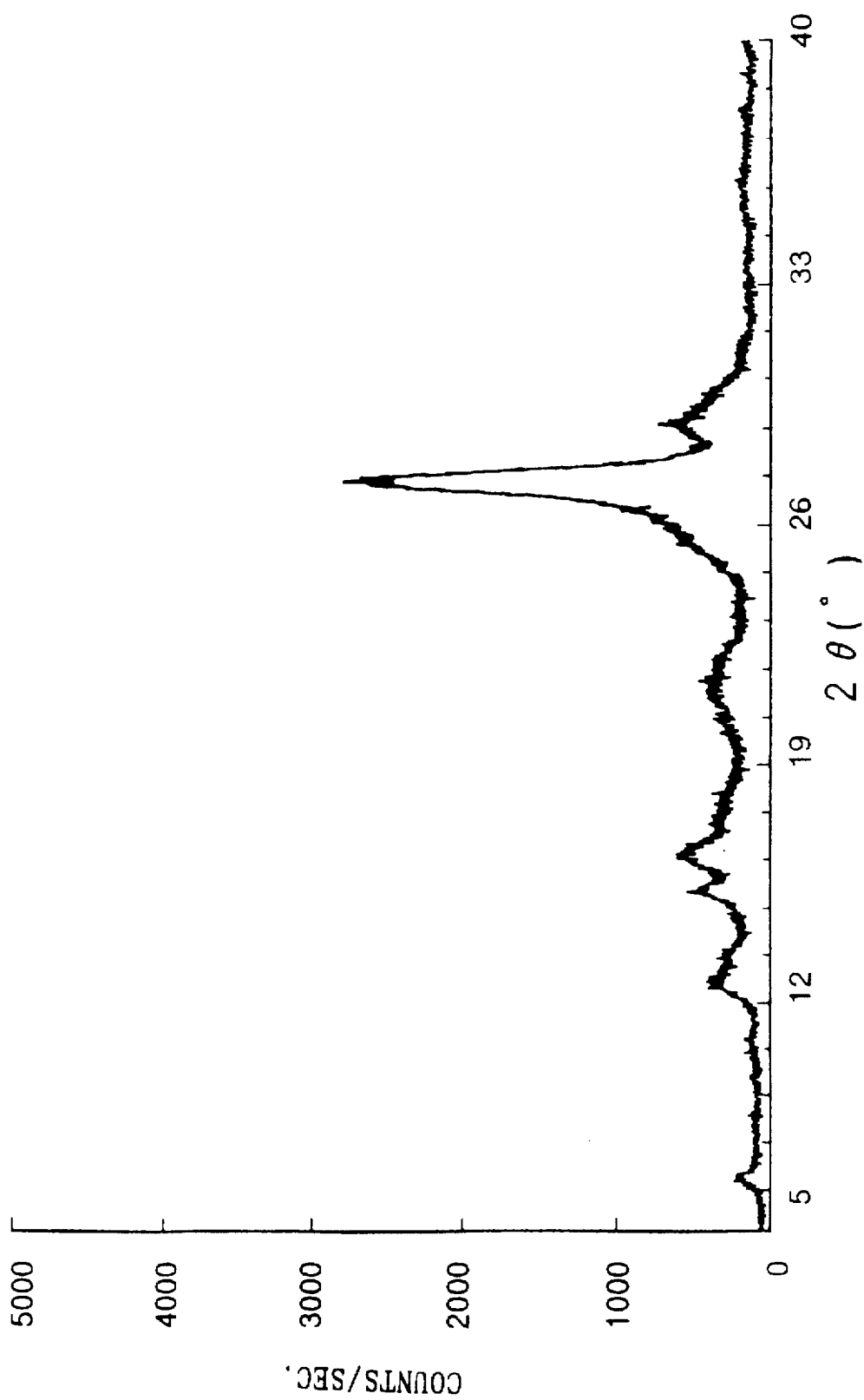
FIG. 13 is a powder X-ray diffraction spectrum of a chlorogallium phthalocyanine having an electron-withdrawing substituent which was obtained in Example 2.
Figure 14:
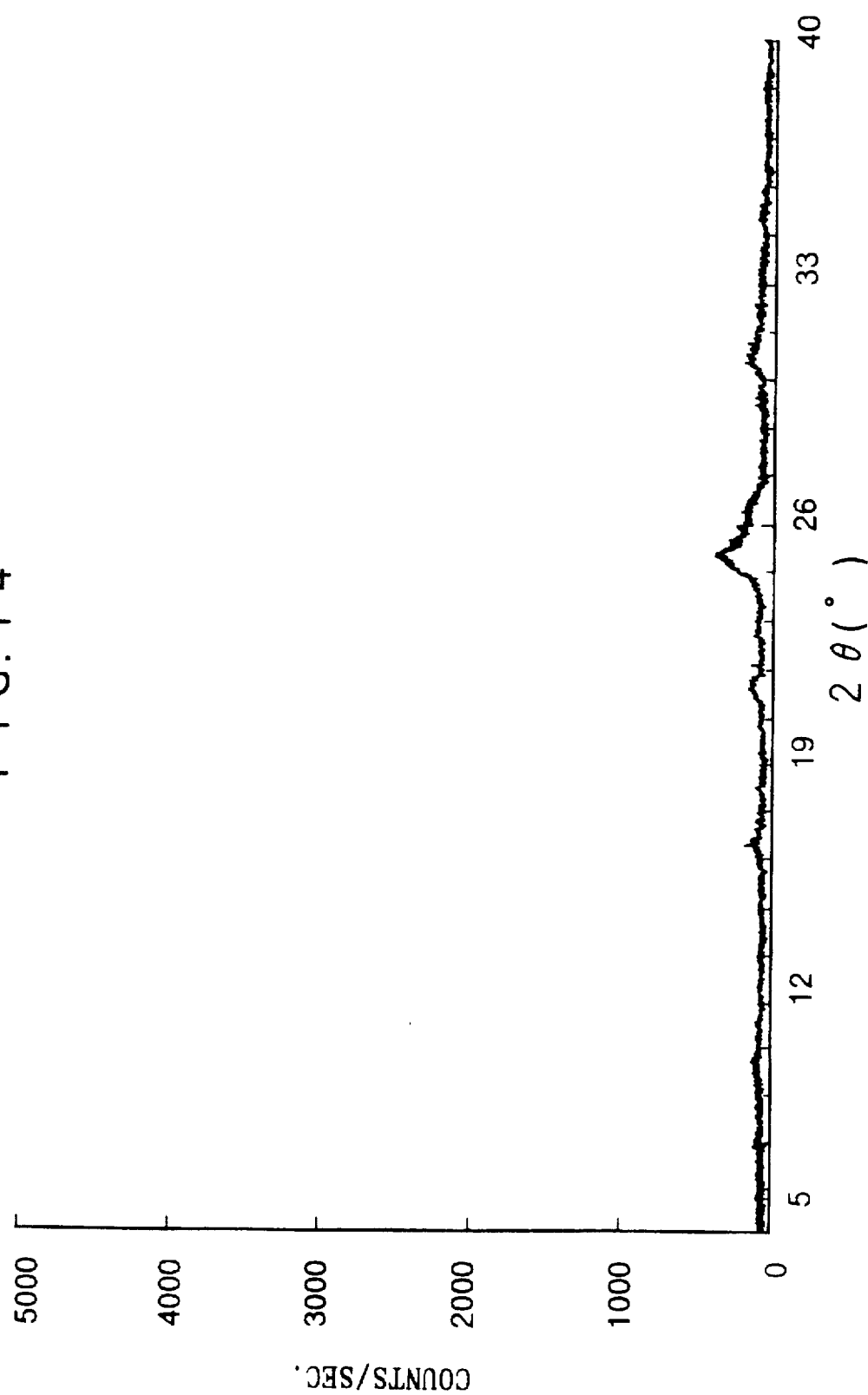
FIG. 14 is a powder X-ray diffraction spectrum of a chlorogallium phthalocyanine having an electron-withdrawing substituent which was obtained in Example 3.
Figure 21:
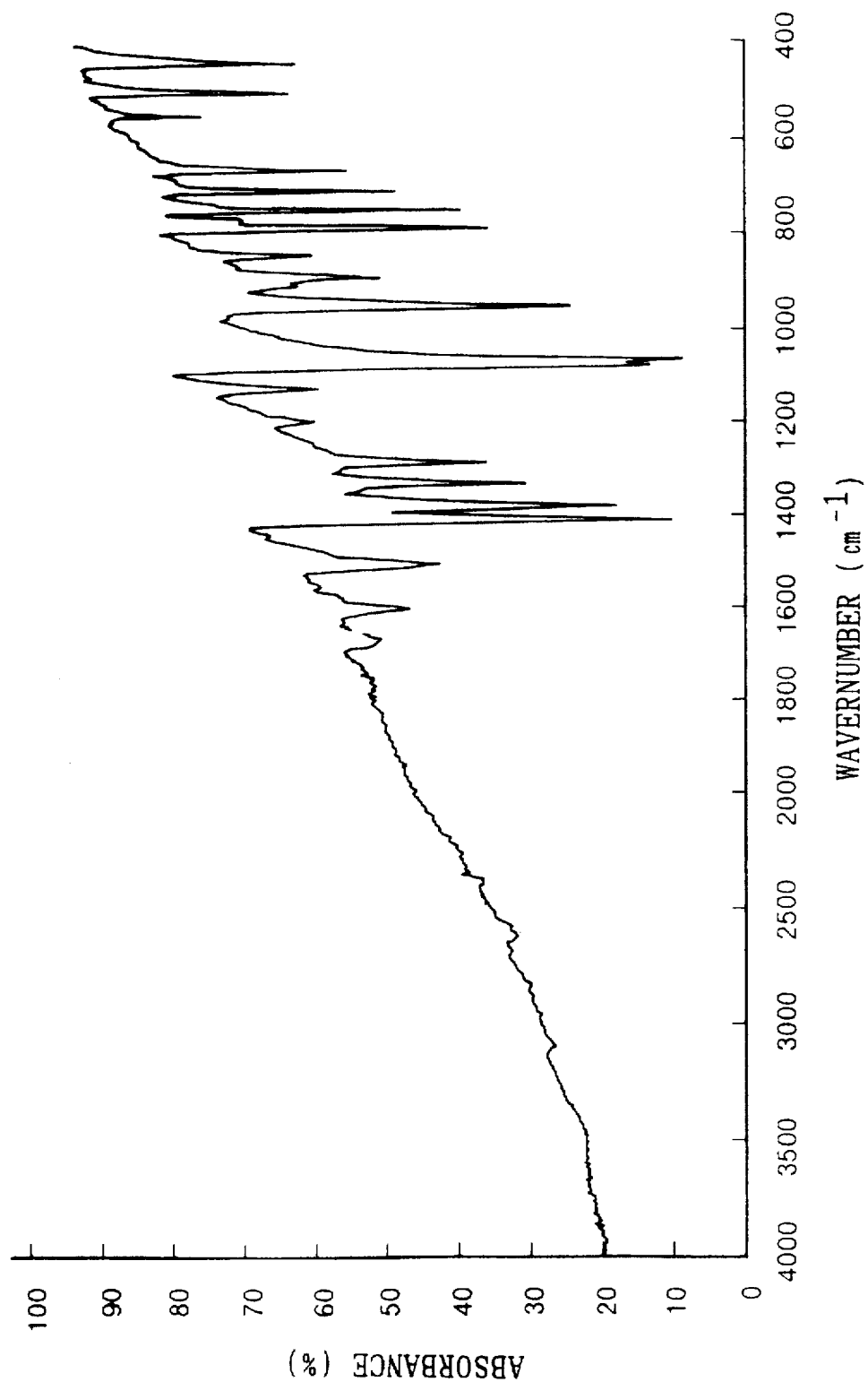
FIG. 21 is an infrared absorption spectrum of a chlorogallium phthalocyanine having an electron-withdrawing substituent which was obtained in Example 1.
Figure 22:
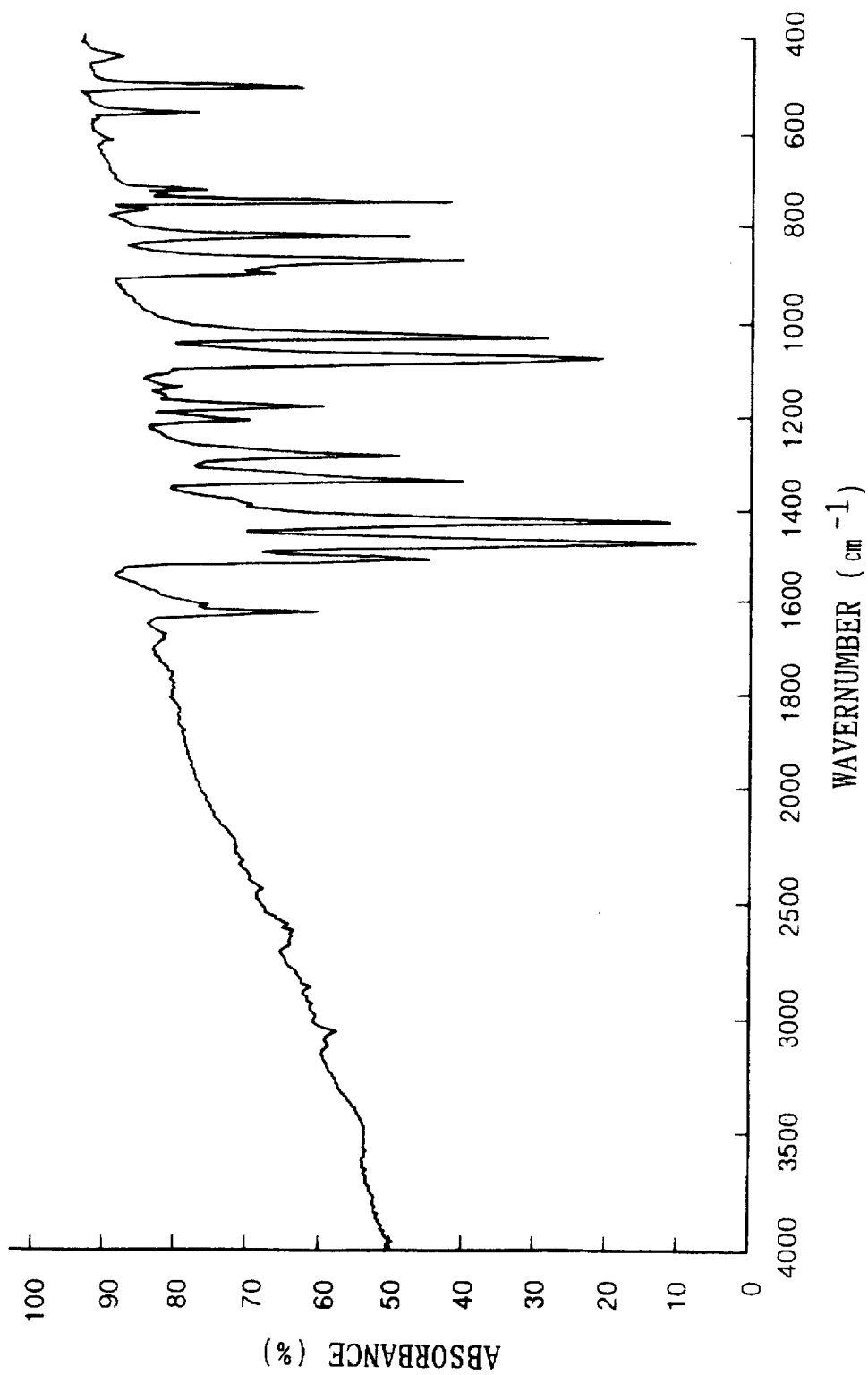
FIG. 22 is an infrared absorption spectrum of a chlorogallium phthalocyanine having an electron-withdrawing substituent which was obtained in Example 2.
Figure 23:
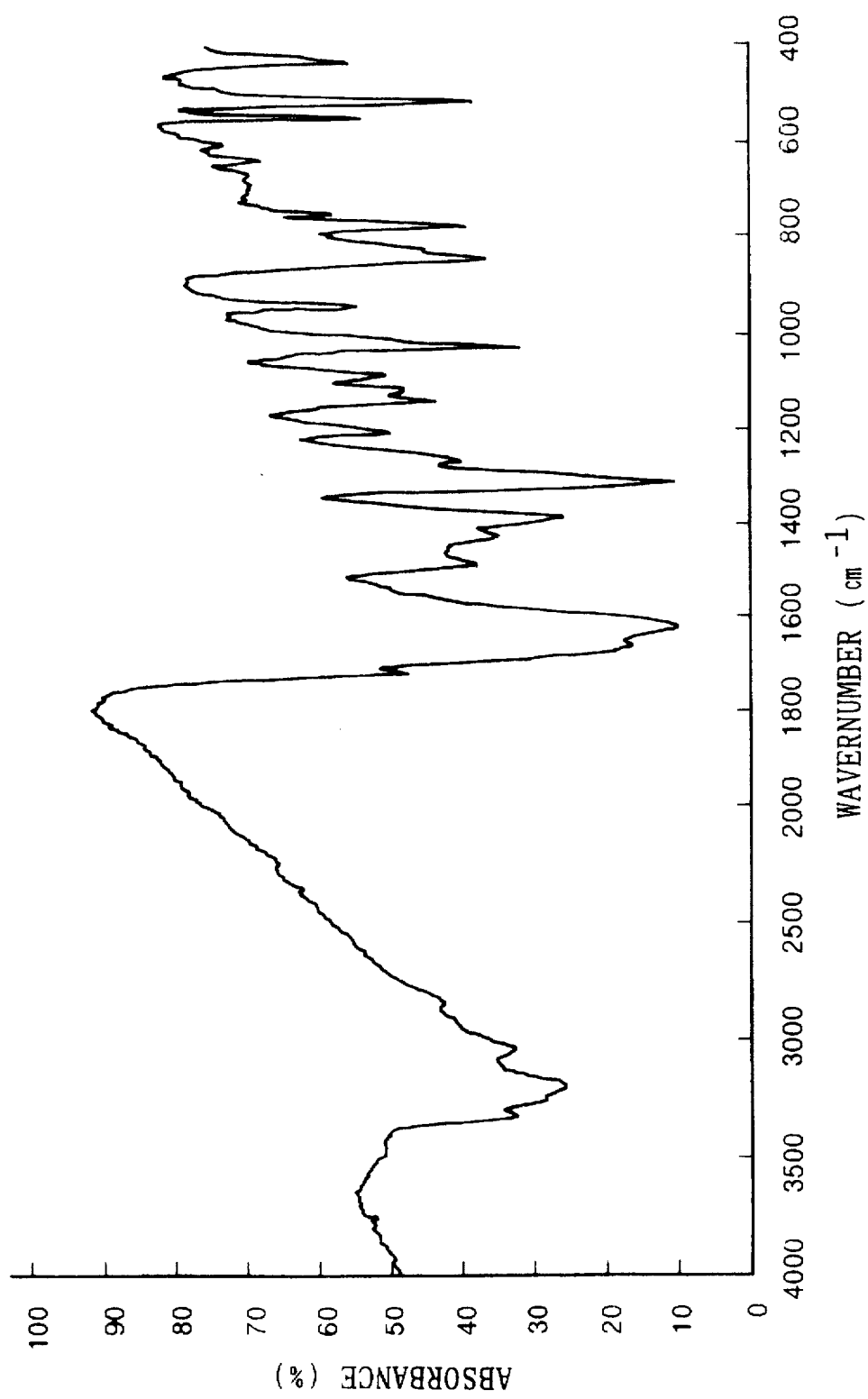
FIG. 23 is an infrared absorption spectrum of a chlorogallium phthalocyanine having an electron-withdrawing substituent which was obtained in Example 3.

Three parts of chlorogallium phthalocyanine substituted with an electron-withdrawing group, obtained each in Synthesis Examples 1–3, was comminuted at dry state by means of an automatic mortar for 24 hours. Next, 0.5 parts of the obtained particulate chlorogallium phthalocyanine substituted with an electron-withdrawing group was each treated with 13.5 parts of N,N-dimethylformamide together with 30 parts of glass beads having a diameter of 2 mm for one week by way of a solvent treatment. Then, the crystals were separated and dried to obtain 0.4 parts each of chlorogallium phthalocyanine substituted with an electron-withdrawing group. The X-ray spectra of the obtained compounds are shown in FIGS. 12–14, respectively, and the IR spectra of the obtained compounds are shown in FIGS. 21–23, respectively. From these X-ray spectra, it can be seen that 8Cl-ClGaPc has a peak at 26.0° to 27.5°, 8F-ClGaPc has peaks at 6.8°, 15.3°, 16.4°, 27.2° and 28.9° and 16Cl-ClGaPc has a peak at 24.5° to 26.5° in Bragg angle(2 θ±0.2°) using Cu-Kα (λ=1.54 Å) as an X-ray source.

Examples 4–6

Figure 15:
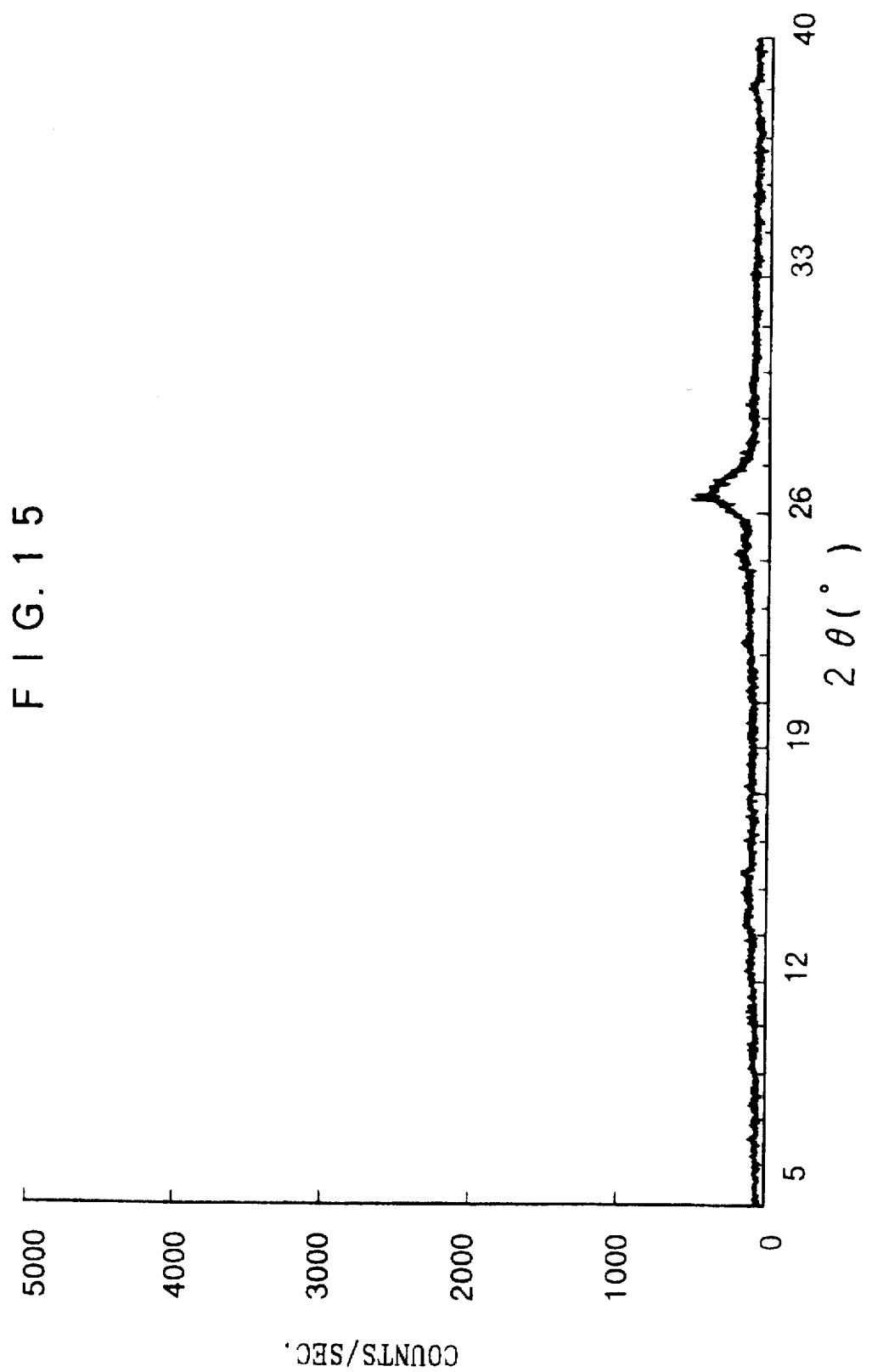
FIG. 15 is a powder X-ray diffraction spectrum of a chlorogallium phthalocyanine having an electron-withdrawing substituent which was obtained in Example 4.
Figure 16:
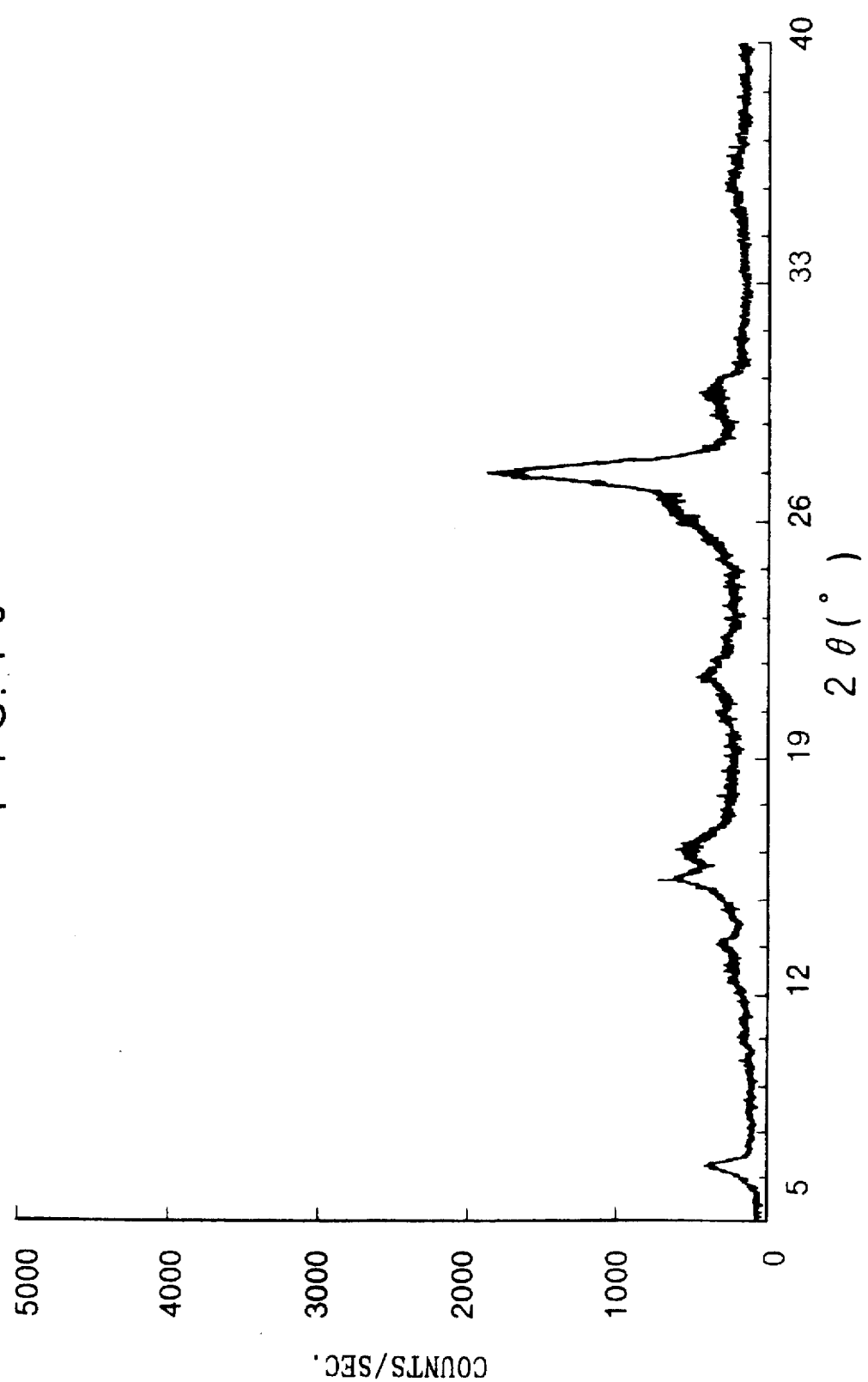
FIG. 16 is a powder X-ray diffraction spectrum of a chlorogallium phthalocyanine having an electron-withdrawing substituent which was obtained in Example 5.
Figure 17:
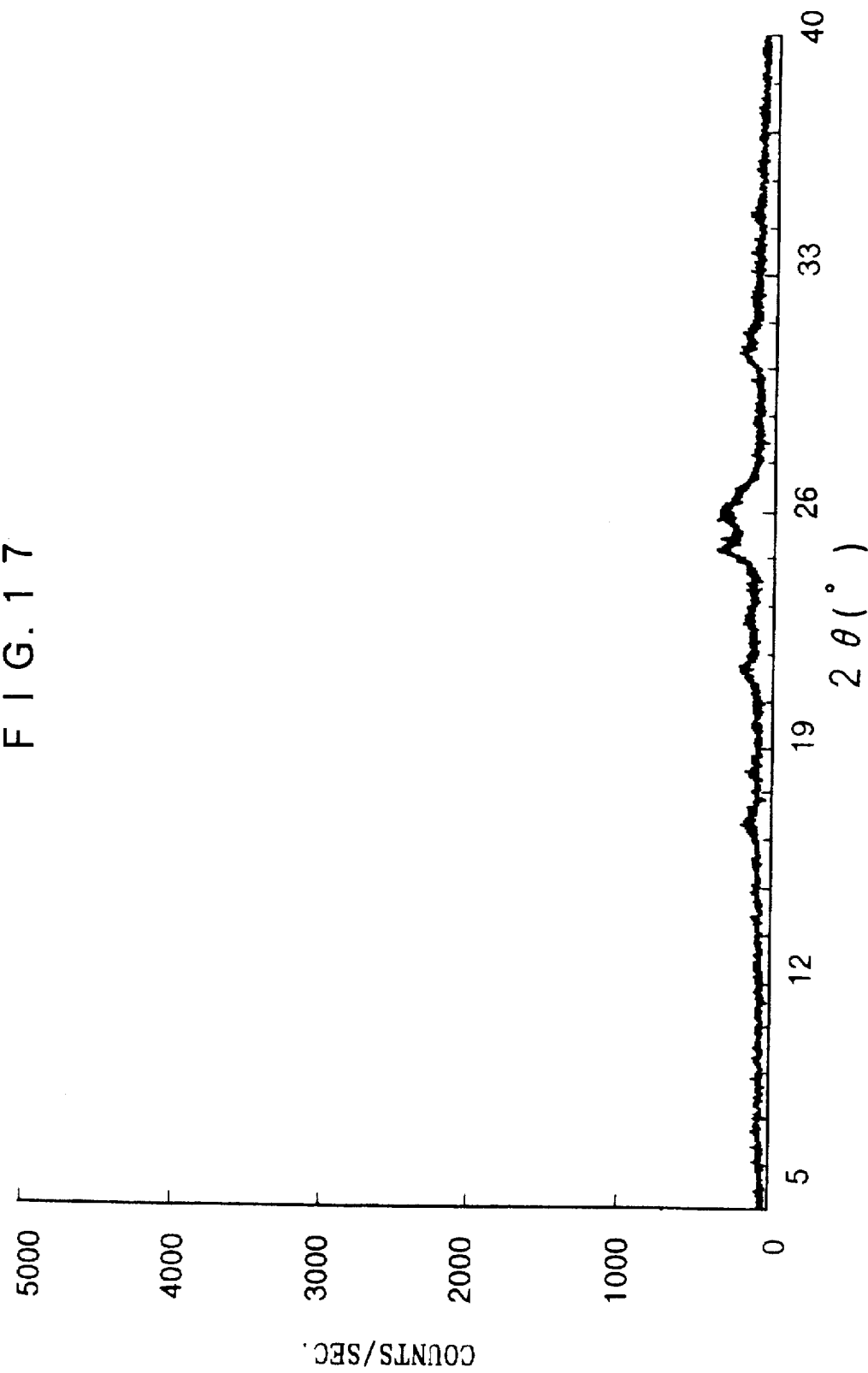
FIG. 17 is a powder X-ray diffraction spectrum of a chlorogallium phthalocyanine having an electron-withdrawing substituent which was obtained in Example 6.

The procedure of Example 1 was repeated except that 13.5 parts of methanol was used in place of 13.5 parts of N,N-dimethylformamide, to obtain 0.4 parts of each chlorogallium phthalocyanine substituted with an electron-withdrawing group. The X-ray spectra of the obtained compounds are shown in FIGS. 15–17, respectively, and the IR spectra of the obtained compounds are shown in FIGS. 24–26, respectively. From these X-ray spectra, it can be seen that 8Cl-ClGaPc has a peak at 26.0° to 27.5°, 8F-ClGaPc has peaks at 6.8°, 15.5°, 16.5°, 27.4° and 30.1° and 16Cl-ClGaPc has a peak at 24.5° to 26.5° in Bragg angle(2 θ±0.2°) using Cu-Kα (λ=1.54 Å) as an X-ray source.

Example 7

An aluminum substrate was coated with a solution which comprised 10 parts of a zirconium compound (trade name "Organotex ZC540" manufactured by Matsumoto Pharmaceutical Co., Ltd.), 1 part of a silane compound (trade name "A1110" manufactured by Nippon Unicar Co., Ltd.), 40 parts of iso-propanol and 20 parts of n-butanol, by means of immersion coating. The coated layer was dried at 150° C. for 10 minutes to form an underlayer having a thickness of 0.2μ.

Then, 1.2 parts of the chlorogallium phthalocyanine substituted with an electron-withdrawing group, obtained in Example 1, was mixed with 0.8 parts of polyvinyl butyral (trade name "S-LEC BM-S" manufactured by Sekisui Chemical Co., Ltd.) and 48 parts of n-butanol. The mixture was placed in a paint shaker loaded with glass beads and was subjected to a dispersing treatment for 2 hours to obtain a coating liquid. The coating liquid obtained was applied to the above-mentioned underlayer by means of wire-bar coating. The coated layer was dried at 115° C. for 10 minutes to form an electric charge generating layer having a thickness of 0.2μ.

Then, 2 parts of N,N'-diphenyl-N,N'-bis(m-tolyl) benzidine represented by the following structural formula (II) as an electric charge transporting substance and 3 parts of a polycarbonate resin [1,1'-di-(p-phenylene)cyclohexane carbonate] represented by the following structural formula (III) were dissolved in 20 parts of chlorobenzene to obtain a coating liquid. The obtained coating liquid was applied to the aforementioned electric charge generating layer on aluminum substrate by means of immersion coating. The coated layer was dried at 120° C. for 1 hours to form an electric charge transporting layer having a thickness of 20μ. In this way, a laminate electrographic photosensitive member was prepared.

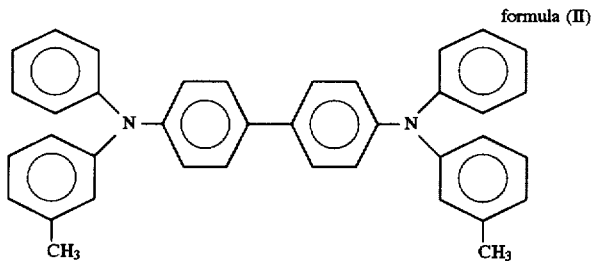

formula (II)

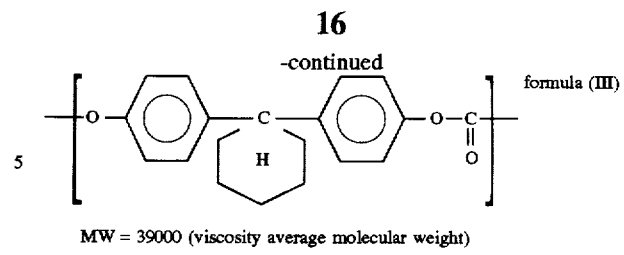

formula (III)

MW = 39000 (viscosity average molecular weight)

n=degree of polymerization

Examples 8–12

Electrographic photosensitive members were obtained by repeating the procedure of Example 7 excepting that chlorogallium phthalocyanines substituted with an electron-withdrawing group obtained from Examples 2–6 were used.

Example 13

By the same manner as in Example 7, an underlayer having a thickness of 0.2μ was formed by the steps of coating an aluminum substrate with a solution which comprised 10 parts of Organotex ZC540, 1 part of A1110, 40 parts of iso-propanol and 20 parts of n-butanol, by means of immersion coating and then drying the coated layer at 150° C. for 10 minutes.

Then, 1.2 parts of the chlorogallium phthalocyanine substituted with an electron-withdrawing group, obtained in Example 1, was mixed with 0.8 parts of Eslec BM-S and 18 parts of n-butanol. The mixture was placed in a paint shaker loaded with glass beads and was subjected to a dispersing treatment for 2 hours to obtain a coating liquid. The coating liquid obtained was applied to the above-mentioned underlayer by means of wire-bar coating. The coated layer was dried at 115° C. for 60 minutes to form an electric charge generating layer having a thickness of about 10μ. In this way, a single-layer electrographic photosensitive member was obtained.

Example 14

An electrographic photosensitive member was obtained by repeating the procedure of Example 13 excepting that chlorogallium phthalocyanine substituted with an electron-withdrawing group obtained from Example 5 was used.

By use of electrographic photosensitive members obtained from Examples 7–14 and also from Comparative Examples 3–5 described hereinafter, properties in electrostatic photography were measured in the following manner.

Using a machine scanner, a photosensitive member was charged to an initial surface voltage of −800(V) by a corona discharge in a condition of room temperature and normal humidity (20° C., 40% RH). After standing of 0.538 seconds, $V_{DDP}$ (V) was measured to calculate a value of dark damping $V_{DDR}$ (V) ($V_{DDR}=V_{DDP}-(-800)$). Then, using a monochrometer, the light from a tungsten lamp was spectroscopically converted into a monochromatic ray of 780 nm, which was used to irradiate the surface of the photosensitive member. By this irradiation, an initial sensitivity (initial value of damping potential per unit quantity of light) was measured as dV/dE (kV·m²/J). In addition, a value of residual potential $V_{RP}$ after the irradiation of 10 mJ/m² was measured. The results are shown in Table 1.

TABLE 1

| | gallium phthalocyanine used | $V_{DDP}(V)$ | $V_{DDR}(V)$ | dV/dE (kV m²/J) | $V_{RP}(V)$ |
|---|---|---|---|---|---|
| EX. 7 | EX. 1 | −787 | 13 | 192 | 29 |
| EX. 8 | EX. 2 | −786 | 14 | 193 | 26 |
| EX. 9 | EX. 3 | −772 | 28 | 204 | 18 |
| EX. 10 | EX. 4 | −785 | 15 | 188 | 32 |
| EX. 11 | EX. 5 | −788 | 12 | 198 | 30 |
| EX. 12 | EX. 6 | −773 | 27 | 208 | 15 |
| EX. 13 | EX. 1 | −782 | 18 | 216 | 55 |
| EX. 14 | EX. 5 | −785 | 15 | 220 | 51 |
| COMP. EX. 3 | COMP. EX. 1 | −785 | 15 | 183 | 52 |
| COMP. EX. 4 | COMP. EX. 2 | −788 | 12 | 175 | 55 |
| COMP. EX. 5 | COMP. EX. 1 | −787 | 13 | 152 | 82 |

EX.: Example
COMP. EX.: Comparative Example

Comparative Synthesis Example 1
Synthesis of chlorogallium phthalocyanine

Ten parts of phthalonitrile were dispersed in 20 parts of α-chloronaphthalene in a nitrogen atmosphere at room temperature. To this dispersion, there were added 3.1 parts of gallium trichloride together with 45 parts of α-chloronaphthalene, and the mixture was reacted at 200° C. for 5 hours. Then, the product was subjected to hot filtration and washed with DMSO and with methanol. The wet cake was dried under reduced pressure to obtain 7.1 parts of chlorogallium phthalocyanine.

Comparative Example 1

The procedure of Example 1 was repeated excepting that chlorogallium phthalocyanine obtained from Comparative Synthesis Example 1 was used to obtain 0.4 parts of chlorogallium phthalocyanine.

Comparative Example 2

The procedure of Example 4 was repeated excepting that chlorogallium phthalocyanine obtained from Comparative Synthesis Example 1 was used to obtain 0.4 parts of chlorogallium phthalocyanine.

Comparative Examples 3–4

Electrographic photosensitive members were obtained by repeating the procedure of Example 7 excepting that chlorogallium phthalocyanines obtained from Comparative Examples 1–2 were used.

Comparative Example 5

An electrographic photosensitive member was obtained by repeating the procedure of Example 13 excepting that chlorogallium phthalocyanine obtained from Comparative Example 1 was used.

Example 15

Five parts of the chlorogallium phthalocyanine substituted with an electron-withdrawing group, obtained in Example 1, was mixed with 1 part of polyvinyl butyral (trade name "S-LEC BM-S" manufactured by Sekisui Chemical Co., Ltd.) and 80 parts of butyl acetate. The mixture was placed in a paint shaker loaded with 250 parts of steel balls having a diameter of ⅛ inches and was subjected to a dispersing treatment for 5 hours to obtain a coating liquid. The coating liquid obtained was applied to an aluminum substrate by means of immersion coating. The coated layer was dried at 100° C. for 15 minutes to form an underlayer having a thickness of 2μ.

Then, 1.0 part of an X-type metal-free phthalocyanine was mixed with 1 part of polyvinyl butyral (trade name "S-LEC BM-S" manufactured by Sekisui Chemical Co., Ltd.) and 100 parts of butyl acetate. The mixture was placed in a paint shaker loaded with 250 parts of steel balls having a diameter of ⅛ inches and was subjected to a dispersing treatment for 2 hours to obtain a coating liquid. The coating liquid obtained was applied to the aforementioned underlayer on an aluminum substrate by means of immersion coating. The coated layer was dried at 100° C. for 10 minutes to form an electric charge generating layer having a thickness of 0.18μ.

Then, 2 parts of N,N'-diphenyl-N,N'-bis(m-tolyl) benzidine represented by the aforedescribed structural formula (II) as an electric charge transporting substance and 3 parts of [1,1'-di-(p-phenylene)cyclohexane carbonate] represented by the aforedescribed structural formula (III) were dissolved in 20 parts of chlorobenzene to obtain a coating liquid. The coating liquid obtained was applied to the aforementioned electric charge generating layer on aluminum substrate by means of immersion coating. The coated layer was dried at 115° C. for 1 hour to form an electric charge transporting layer having a thickness of 20μ.

Examples 16–20

Electrographic photosensitive members were obtained by repeating the procedure of Example 15 excepting that chlorogallium phthalocyanines substituted with an electron-withdrawing group obtained from Examples 2–6 were used, respectively.

Comparative Example 6

An electrographic photosensitive member was obtained according to Example 15, but the underlayer was not formed.

Comparative Example 7

An electrographic photosensitive member was obtained by repeating the procedure of Example 15 excepting that a coating liquid which comprised 5 parts of methoxymethylated nylon (trade name "Tresin EF-30T" manufactured by Teikoku Chemical Industry, Co., Ltd.) dissolved in 90 parts of methanol, was used for the formation of the underlayer.

Comparative Example 8

An electrographic photosensitive member was obtained according to Example 15, except that 1.0 part of crystals of Perylene Red R-190 was used in place of chlorogallium phthalocyanine substituted with an electron-withdrawing group for the underlayer.

Evaluation of photosensitive members obtained in Examples 15–20 and in Comparative Examples 6–8

By use of the electrographic photosensitive members obtained in the above, properties in electrostatic photography were measured in the following manner.

Using an electrostatic copying paper testing machine (Electrostatic Analyzer EPA-8100 manufactured by Kawaguchi Electric Co., Ltd.), a photosensitive member was charged by a corona discharge of −6 KV in a condition of room temperature and normal humidity (20° C., 40% RH). Then, using a monochrometer, the light from a tungsten lamp was spectroscopically converted into a monochromatic ray of 780 nm, which was used to irradiate the surface of the photosensitive member so that 1 μW/cm$^2$ was obtained on the surface. Then, an initial surface potential $V_0$, and a half exposure value $E_{1/2}$ (μJ/cm$^2$), which was a light exposure amount required to drop the initial surface potential $V_0$ to a half, were measured. Next, the surface of the photosensitive body was irradiated with 10 lx tungsten light for one second and the residual potential $V_R$ (V) was measured. Damping rate DDR(%) was also measured. Besides, values of $V_0$, $E_{1/2}$, DDR and $V_R$ were measured, after a cycle of the above-mentioned charging and discharging had been repeated 3,000 times. Meanwhile, under the same condition as in Examples 15–20 and in Comparative Examples 6–8, drum-shaped photosensitive members were prepared, which were each fitted to a laser beam printer (FXX-15 manufactured by Fuji Xerox Co., Ltd.) and were used to take 20,000 copies of image. The results are shown in Table 2.

which is substituted with an electron-withdrawing group and has the following formula (I):

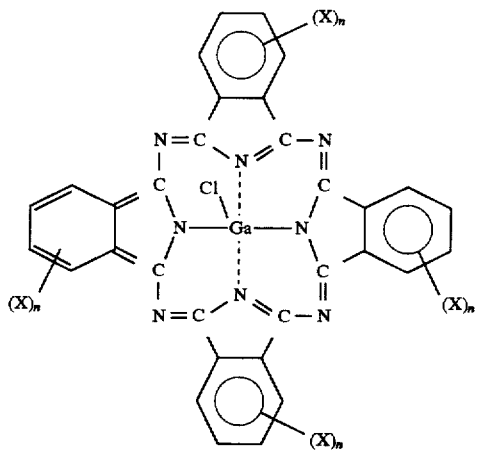

where X represents the electron-withdrawing group and n is an integer of 2 to 4, and where the electron-withdrawing

TABLE 2

| | Underlayer incorporated compound | initial properties (1st) | | | | maintenance of properties (3000th) | | | | quality of copied image (after 20,000 copies) |
|---|---|---|---|---|---|---|---|---|---|---|
| | | $V_O$ (V) | $E_{1/2}$ (μJ/cm$^2$) | DDR (%) | $V_{RP}$ (V) | $V_O$ (V) | $E_{1/2}$ (μJ/cm$^2$) | DDR (%) | $V_{RP}$ (V) | |
| EX. 15 | EX. 1 | −818 | 4.6 | 2.0 | 22 | −820 | 4.6 | 2.0 | 22 | free of defect |
| EX. 16 | EX. 2 | −821 | 4.5 | 2.0 | 21 | −819 | 4.8 | 2.0 | 24 | free of defect |
| EX. 17 | EX. 3 | −832 | 4.4 | 2.0 | 23 | −829 | 4.7 | 2.0 | 26 | free of defect |
| EX. 18 | EX. 4 | −830 | 4.6 | 2.1 | 24 | −830 | 4.6 | 2.1 | 27 | free of defect |
| EX. 19 | EX. 5 | −832 | 4.5 | 2.0 | 25 | −831 | 4.6 | 2.0 | 28 | free of defect |
| EX. 20 | EX. 6 | −832 | 4.7 | 1.9 | 18 | −830 | 4.7 | 2.1 | 23 | free of defect |
| COMP. EX. 6 | no underlayer | −675 | 4.8 | 4.0 | 33 | −675 | 5.7 | 5.5 | 41 | many dark spots |
| COMP. EX. 7 | methoxymethylated nylon | −705 | 4.7 | 3.0 | 24 | −675 | 5.4 | 4.1 | 39 | many dark spots |
| COMP. EX. 8 | Perylene Red R-190 | −741 | 4.7 | 2.8 | 23 | −675 | 5.5 | 3.2 | 34 | many small dark spots |

EX.: Example
COMP. EX.: Comparative Example

Since the photoconductive material utilizing the chlorogallium phthalocyanine substituted with an electron-withdrawing group obtained according to the present invention provides a sensitive wavelength extending to the vicinity of 780 nm, it is very useful as a photosensitive material in a field of such application as photosensitive member for a printer or digital copier utilizing a semiconductor laser. Besides, by incorporating at least one chlorogallium phthalocyanine substituted with an electron-withdrawing group into the photosensitive layer and/or underlayer of the electrographic photosensitive member in the present invention, the problems associated with a conventional photosensitive layer or underlayer are overcome. Accordingly, the present invention can provide a highly reliable electrographic photosensitive member, characterized by the maintenance of a high sensitivity, a highly chargeable property and a low residual potential during repeated use and therefore by the creation of an excellent image free of reduction in density and free of tinting of background even after use for a long period of time.

What is claimed is:

1. An electrographic photosensitive member, comprising in a photosensitive layer a chlorogallium phthalocyanine group is selected from the group consisting of a halogen, a nitro group, a cyano group and a sulfone group.

2. The electrographic photosensitive member of claim 1, wherein the photosensitive layer is negatively charged.

3. The electrographic photosensitive member of claim 1, wherein the electron-withdrawing group is selected from the group consisting of a halogen atom and a nitro group.

4. The electrographic photosensitive member of claim 1, wherein the electron-withdrawing group is selected from the group consisting of a fluorine atom and a chlorine atom.

5. The electrographic photosensitive member of claim 1, wherein the chlorogallium phthalocyanine is at least one crystalline substance selected from the group consisting of a crystalline substance in which n is 2 and X is chlorine and Bragg angle (2 θ±0.2°) of which exhibits a peak at 26.8° or at 26.0° to 27.5°, a crystalline substance in which n is 2 and X is fluorine and Bragg angle (2 θ±0.2°) of which exhibits peaks at 7.0°, 15.2° and 27.1° or at 6.8°, 15.3°, 16.4°, 27.2° and 28.9° or at 6.8°, 15.5°, 16.5°, 27.4° and 30.1°, and a crystalline substance in which n is 4 and X is chlorine and Bragg angle (2 θ±0.2°) of which exhibits peaks at 21.3°, 23.0°, 24.9°, 26.1°, 30.7° and 31.3° or at 24.5° to 26.5°, and wherein the Bragg angle is obtained by X-ray diffraction spectroscopy using a Cu-Kα ($\lambda$=1.5 Å) X-ray source.

6. The electrographic photosensitive member of claim 1, further comprising an electroconductive support adjacent to the photosensitive layer, wherein the photosensitive layer comprises a laminate of an electric charge generating layer and an electric charge transporting layer, and wherein the electric charge generating layer comprises the chlorogallium phthalocyanine and a binder resin.

7. The electrographic photosensitive member of claim 6, wherein the photosensitive layer is negatively charged.

8. The electrographic photosensitive member of claim 6, wherein the electron-withdrawing group is selected from the group consisting of a halogen atom and a nitro group.

9. The electrographic photosensitive member of claim 6, wherein the binder resin is at least one resin selected from the group consisting of a polyvinyl acetal resin, a polyarylate resin, an acrylic resin and a methacrylic resin.

10. The electrographic photosensitive member of claim 6, wherein the weight ratio of the chlorogallium phthalocyanine to the binder resin is in the range of 40:1 to 1:20.

11. The electrographic photosensitive member of claim 6, wherein the electric charge generating layer has a thickness in the range of 0.05 to 5 μm.

12. The electrographic photosensitive member of claim 1, further comprising an electroconductive support adjacent to the photosensitive layer, wherein the photosensitive layer consists of a single photoconductive layer, and wherein the photoconductive layer comprises the chlorogallium phthalocyanine and a binder resin.

13. The electrographic photosensitive member of claim 12, wherein the photosensitive layer is negatively charged.

14. The electrographic photosensitive member of claim 12, wherein the electron-withdrawing group is selected from the group consisting of a halogen atom and a nitro group.

15. The electrographic photosensitive member of claim 12, wherein the binder resin is at least one resin selected from the group consisting of a vinylchloride/vinylacetate copolymer, a polyvinyl acetal resin, a polyarylate resin, an acrylic resin and a methacrylic resin.

16. The electrographic photosensitive member of claim 12, wherein the weight ratio of the chlorogallium phthalocyanine to the binder resin is in the range of 40:1 to 1:20.

17. The electrographic photosensitive member of claim 12, wherein the photoconductive layer has a thickness in the range of 5 to 50 μm.

18. The electrographic photosensitive member of claim 1, further comprising an underlayer and an electroconductive support, the underlayer being between the electroconductive support and the photosensitive layer, and wherein at least one of the underlayer and the photosensitive layer comprises the chlorogallium phthalocyanine.

19. The electrographic photosensitive member of claim 18, wherein the electron-withdrawing group is selected from the group consisting of a halogen atom and a nitro group.

20. The electrographic photosensitive member of claim 18, wherein the electron-withdrawing group is selected from the group consisting of a fluorine atom and a chlorine atom.

21. The electrographic photosensitive member of claim 18, wherein the chlorogallium phthalocyanine is at least one crystalline substance selected from the group consisting of a crystalline substance in which n is 2 and X is chlorine and Bragg angle (2 θ±0.2°) of which exhibits a peak at 26.8° or at 26.0° to 27.5°, a crystalline substance in which n is 2 and X is fluorine and Bragg angle (2 θ±0.2°) of which exhibits peaks at 7.0°, 15.2° and 27.1° or at 6.8°, 15.3°, 16.4°, 27.2° and 28.9° or at 6.8°, 15.5°, 16.5°, 27.4° and 30.1°, and a crystalline substance in which n is 4 and X is chlorine and Bragg angle (2 θ±0.2°) of which exhibits peaks at 21.3°, 23.0°, 24.9°, 26.1°, 30.7° and 31.3° or at 24.5° to 26.5°, and wherein the Bragg angle is obtained by X-ray diffraction spectroscopy using a Cu-Kα ($\lambda$=1.5 Å) X-ray source.

* * * * *